United States Patent
Ngai et al.

(10) Patent No.: US 7,366,142 B2
(45) Date of Patent: Apr. 29, 2008

(54) CONTROLLING MULTIPLE MODEMS IN A WIRELESS TERMINAL USING DYNAMICALLY VARYING MODEM TRANSMIT POWER LIMITS

(75) Inventors: Francis M. Ngai, Louisville, CO (US); Aziz Gholmieh, San Diego, CA (US); Douglas A. Gerecht, Golden, CO (US); Jon J. Anderson, Boulder, CO (US); William R. Panton, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 243 days.

(21) Appl. No.: 11/217,819

(22) Filed: Sep. 1, 2005

(65) Prior Publication Data
US 2006/0003793 A1    Jan. 5, 2006

Related U.S. Application Data

(63) Continuation of application No. 10/283,934, filed on Oct. 29, 2002, now Pat. No. 7,016,697.

(51) Int. Cl.
*H04B 7/216* (2006.01)
*H04L 1/00* (2006.01)
*H04Q 7/20* (2006.01)

(52) U.S. Cl. .................. 370/335; 370/252; 455/522

(58) Field of Classification Search ............... 455/522, 455/69, 127.1; 370/335, 252
See application file for complete search history.

(56) References Cited

U.S. PATENT DOCUMENTS

| | | | |
|---|---|---|---|
| 4,901,307 A | 2/1990 | Gilhousen et al. | |
| 5,056,109 A | 10/1991 | Gilhousen et al. | |
| 5,383,219 A | 1/1995 | Wheatley, III et al. | |
| 5,396,516 A | 3/1995 | Padovani et al. | |
| 5,559,790 A | 9/1996 | Yano et al. | |
| 5,691,974 A | 11/1997 | Zehavi et al. | |
| 5,737,687 A | 4/1998 | Martin et al. | |
| 5,884,187 A | 3/1999 | Ziv et al. | |
| 6,084,906 A * | 7/2000 | Kao et al. ................... 375/220 |
| 6,157,619 A * | 12/2000 | Ozluturk et al. ............ 370/252 |
| 6,181,919 B1 | 1/2001 | Ozluturk | |
| 6,198,911 B1 | 3/2001 | Lea et al. | |

(Continued)

FOREIGN PATENT DOCUMENTS

EP    1071226    1/2001

*Primary Examiner*—Tilahun Gesesse
(74) *Attorney, Agent, or Firm*—Gregory D. Ogrod; Stanton C. Braden; Thomas R. Rouse

(57) ABSTRACT

A mobile wireless terminal (MWT) includes multiple wireless modems. The multiple modems have their respective transmit outputs combined together to produce an aggregate transmit output. The multiple modems can concurrently transmit data in a reverse link direction and receive data in a forward link direction. The MWT is constrained to operate under an aggregate transmit power limit. Each of the multiple modems has an individual transmit limit related to the aggregate transmit power limit. An MWT controller adjusts the individual transmit power limits in the multiple modems based on an aggregate transmit power limit of the MWT and respective transmit power estimates from the modems, to cause each individual transmit power limit to track a corresponding individual modem transmit power.

12 Claims, 21 Drawing Sheets

U.S. PATENT DOCUMENTS

| | | | |
|---|---|---|---|
| 6,222,878 B1 * | 4/2001 | McCallister et al. | 375/225 |
| 6,330,278 B1 * | 12/2001 | Masters et al. | 375/223 |
| 6,359,934 B1 * | 3/2002 | Yoshida | 375/262 |
| 6,751,199 B1 * | 6/2004 | Sindhushayana et al. | 370/252 |
| 6,819,669 B2 * | 11/2004 | Rooney | 370/390 |
| 6,847,622 B1 * | 1/2005 | Emmons et al. | 370/335 |
| 2002/0001292 A1 * | 1/2002 | Miyamoto | 370/335 |
| 2002/0106990 A1 * | 8/2002 | Ozluturk | 455/69 |

* cited by examiner

CONTROLLING MULTIPLE MODEMS IN A WIRELESS TERMINAL USING DYNAMICALLY VARYING MODEM TRANSMIT POWER LIMITS

CLAIM OF PRIORITY UNDER 35 U.S.C. §120

The present Application for Patent is a Continuation and claims priority to patent application Ser. No. 10/283,934 entitled "CONTROLLING MULTIPLE MODEMS IN A WIRELESS TERMINAL USING DYNAMICALLY VARYING MODEM TRANSMIT POWER LIMITS" filed Oct. 29, 2002 now U.S. Pat. No. 7,016,697, and assigned to the assignee hereof and hereby expressly incorporated by reference herein.

REFERENCE TO CO-PENDING APPLICATION FOR PATENT

This application is related to commonly-owned applications, both filed on Oct. 29, 2002, entitled "Wireless Terminal Operating Under An Aggregate Transmit Power Limit Using Multiple Modems Having Fixed Individual Transmit Power Limits" having U.S. application Ser. No. 10/283,676, and "Controlling Multiple Modems In A Wireless Terminal Using Energy-Per-Bit Determinations" having U.S. application Ser. No. 10/283,935, which are incorporated herein by reference.

BACKGROUND

1. Field

The present invention relates generally to mobile wireless terminals, and particularly, to mobile wireless terminals having multiple modems which are constrained to operate under an aggregate transmit power limit for all of the modems.

2. Background

In a data call established between a mobile wireless terminal (mwt) and a remote station, the mwt can transmit data to the remote station over a "reverse" communication link. Also, the mwt can receive data from the remote station over a "forward" communication link. There is an ever pressing need to increase the transmit and receive bandwidth, that is, the data rates, available over both the forward and reverse links.

Typically, the mwt includes a transmit power amplifier to power-amplify a radio frequency (rf) input signal. The power amplifier produces an amplified, rf output signal having an output power responsive to the input power of the input signal. An inordinately high input power may overdrive the power amplifier, and thus cause the output power to exceed an acceptable operating transmit power limit of the power amplifier. In turn, this may cause undesired distortion of the RF output signal, including unacceptable out-of-band RF emissions. Therefore, there is a need to carefully control the input and/or output power of the transmit power amplifier in an MWT so as to avoid overdriving the power amplifier. There is a related need to control the output power as just mentioned, while minimizing to the extent possible, any reduction of the forward and reverse link bandwidth (that is, data rates).

SUMMARY

A feature of the present invention is to provide an MWT that maximizes an overall communication bandwidth in both the reverse and forward link directions using a plurality of concurrently operating communication links, each associated with a respective one of a plurality of modulator-demodulators (modems) of the MWT.

Another feature of the present invention is to provide an MWT that combines multiple modulator-demodulator (modem) transmit signals into an aggregate transmit signal (that is, an aggregate reverse link signal) so that a single transmit power amplifier can be used. This advantageously reduces power consumption, cost, and space requirements compared to known systems using multiple power amplifiers.

Another feature of the present invention is to carefully control an aggregate input and/or output power of the transmit power amplifier, thereby avoiding signal distortion at the power amplifier output. A related feature is to control the aggregate input and/or output power in such a manner as to maximize bandwidth (that is, data through-put) in both the reverse and forward link directions.

These features are achieved in several ways. First, individual transmit power limits are established in each of the plurality of modems of the MWT, to limit the respective, individual modem transmit powers. Each individual transmit power limit is derived, in part, from an aggregate transmit power limit for all of the modems. Together, the individual transmit power limits collectively limit the aggregate transmit power of all of the modems.

Second, the present invention adjusts the individual transmit power limits in the modems of the MWT based on the aggregate transmit power limit and respective transmit power estimates from the modems, to cause each individual modem transmit power limit to track a corresponding individual modem transmit power. To do this, the present invention collects and/or determines modem transmit statistics corresponding to a previous transmit period or cycle of the MWT. The modem transmit statistics can include individual modem transmit data rates, individual modem transmit powers, the aggregate transmit data rate of all of the modems, and an aggregate transmit power for all of the modems combined.

The invention also detects over-limit ones (that is, over-limit individual members) of the modems. An over-limit modem has an actual transmit power, or alternatively, a required transmit power, that exceeds the individual transmit power limit established in the modem. In response to detecting an over-limit modem, the present invention determines new individual modem transmit power limits across the modems using the collected statistics, and updates the modems with the new transmit power limits. The new transmit power limits are calculated so as to avoid over-limit conditions in the modems. The new modem limits are used in a next transmit cycle of the MWT. The invention repeats the process periodically, to update the individual transmit limits over time.

In the present invention, only active modems are scheduled to transmit data in the reverse link direction. "Inactive" modems are modems that are not scheduled to transmit data. However, in the present invention, inactive modems are able to receive data in the forward link direction, thereby maintaining a high forward link through-put in the MWT, even when modems are inactive in the reverse link direction.

The present invention is directed to a method of controlling transmit power in a data terminal having N wireless modems with their respective transmit outputs combined to produce an aggregate transmit output, comprising establishing an individual transmit power limit in each of the N modems, scheduling each of a plurality of the N modems to transmit respective data, receiving a respective, reported transmit power estimate from each of the N modems, and adjusting the individual transmit power limits in at least some of the N modems based on the aggregate transmit power limit and the respective transmit power estimates from the N modems. This causes each individual transmit power limit to track a corresponding individual modem transmit power.

The present invention is also directed to an MWT, constrained to operate within an aggregate transmit power limit, including a plurality (N) of wireless modems with their respective transmit outputs combined to produce an aggregate transmit output. The N modems can concurrently transmit data in the reverse link direction and receive data in the forward link direction. One aspect of the present invention is apparatus comprising means for establishing an individual transmit power limit in each of the N modems, means for scheduling each of a plurality of the N modems to transmit respective data, means for receiving a respective, reported transmit power estimate from each of the N modems, and means for adjusting the individual transmit power limits in at least some of the N modems based on the aggregate transmit power limit and the respective transmit power estimates from the N modems.

In further aspects, a method and apparatus is provided for deriving modem transmit limits in a wireless terminal constrained to operate within an aggregate transmit power limit, the wireless terminal including N wireless modems with their respective transmit outputs combined to produce an aggregate transmit output, the modems having individual transmit power limits to limit their respective transmit powers, the modems reporting respective transmit power estimates. The apparatus comprises means for determining an aggregate transmit power encompassing all of the N modems, means for deriving an aggregate transmit power margin based on a difference between the aggregate transmit power and the aggregate transmit power limit, and means for dividing the aggregate transmit power margin among the N modems to produce, for each of the N modems, an individual transmit power limit that is greater than the corresponding transmit power estimate for each modem. This and further aspects of the present invention are described below.

BRIEF DESCRIPTION OF THE DRAWINGS

The features, objects, and advantages of the present invention will become more apparent from the detailed description set forth below when taken in conjunction with the drawings in which like reference characters identify the same or similar elements throughout and wherein:

FIG. 11 also represents an example transmit scenario of the mobile wireless terminal of FIG. 2.

DETAILED DESCRIPTION

A variety of multiple access communication systems and techniques have been developed for transferring information among a large number of system users. However, spread spectrum modulation techniques, such as those used in code division multiple access (CDMA) communication systems provide significant advantages over other modulation schemes, especially when providing service for a large number of communication system users. Such techniques are disclosed in the teachings of U.S. Pat. No. 4,901,307, which issued Feb. 13, 1990 under the title "Spread Spectrum Multiple Access Communication System Using Satellite or Terrestrial Repeaters," and U.S. Pat. No. 5,691,194, which issued Nov. 25, 1997, entitled "Method and Apparatus for Using Full Spectrum Transmitted Power in a Spread Spectrum Communication System for Tracking Individual Recipient Phase Time and Energy," both of which are assigned to the assignee of the present invention, and are incorporated herein by reference in their entirety.

The method for providing CDMA mobile communications was standardized in the United States by the Telecommunications Industry Association in TIA/EIA/IS-95-A entitled "Mobile Station-Base Station Compatibility Standard for Dual-Mode Wideband Spread Spectrum Cellular System," referred to herein as IS-95. Other communications systems are described in other standards such as the IMT-2000/UM, or International Mobile Telecommunications System 2000/Universal Mobile Telecommunications System, standards covering what are referred to as wideband CDMA (WCDMA), cdma2000(such as cdma2000 1× or 3× standards, for example) or TD-SCDMA.

I. Example Communication Environment

Figure 1:
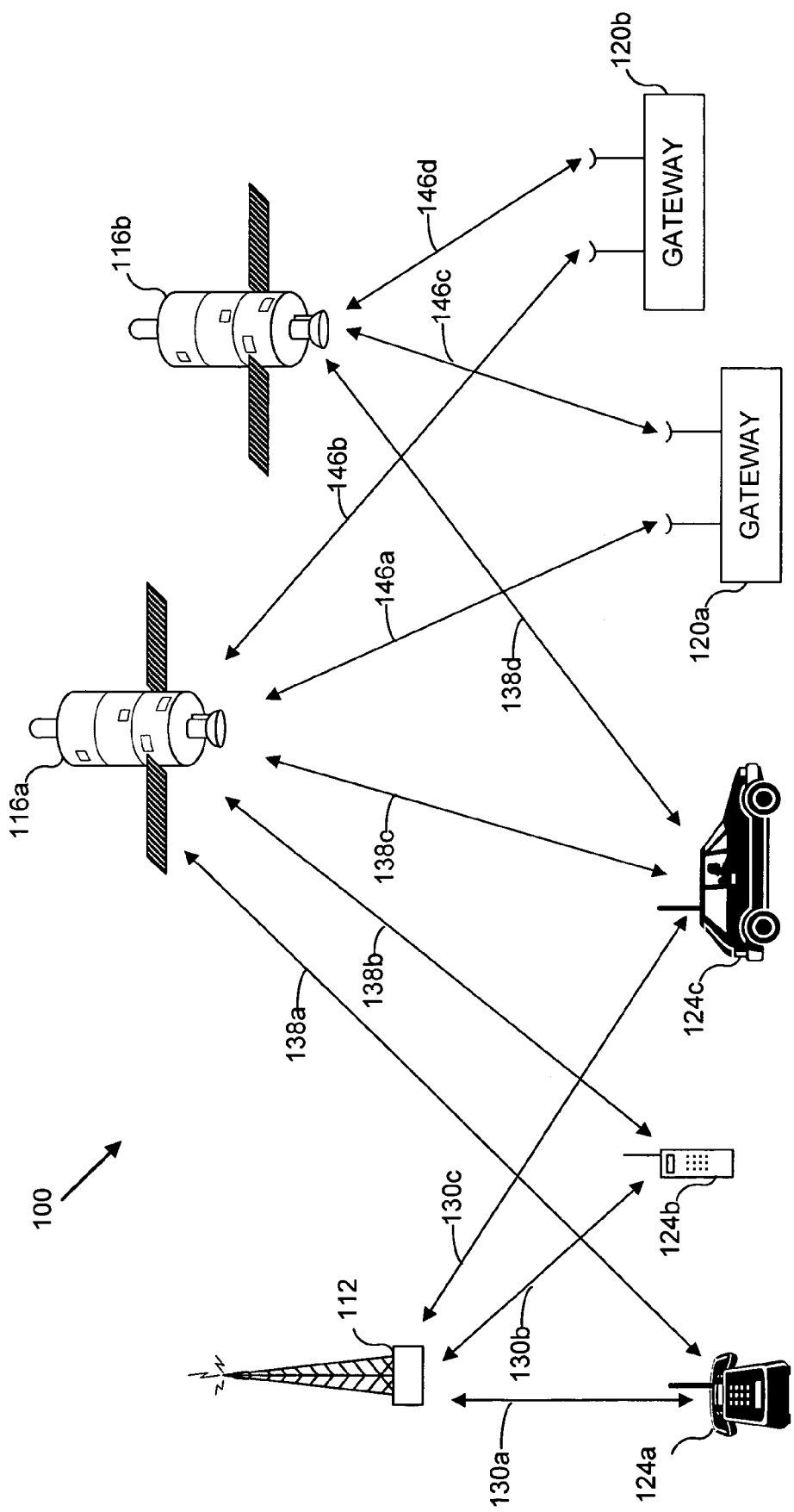
FIG. 1 is an illustration of an example wireless communication system.

FIG. 1 is an illustration of an exemplary wireless communication system (WCS) 100 that includes a base station 112, two satellites 116a and 116b, and two associated gateways (also referred to herein as hubs) 120a and 120b. These elements engage in wireless communications with user terminals 124a, 124b, and 124c. Typically, base stations and satellites/gateways are components of distinct terrestrial and satellite based communication systems. However, these distinct systems may inter-operate as an overall communications infrastructure.

Although FIG. 1 illustrates a single base station 112, two satellites 116, and two gateways 120, any number of these elements may be employed to achieve a desired communications capacity and geographic scope. For example, an exemplary implementation of WCS 100 includes 48 or more satellites, traveling in eight different orbital planes in Low Earth Orbit (LEO) to service a large number of user terminals 124.

The terms base station and gateway are also sometimes used interchangeably, each being a fixed central communication station, with gateways, such as gateways 120, being perceived in the art as highly specialized base stations that direct communications through satellite repeaters while base stations (also sometimes referred to as cell-sites), such as base station 112, use terrestrial antennas to direct communications within surrounding geographical regions.

User terminals 124 each have or include apparatus or a wireless communication device such as, but not limited to, a cellular telephone, wireless handset, a data transceiver, or a paging or position determination receiver. Furthermore each of user terminals 124 can be hand-held, portable as in vehicle-mounted (including for example cars, trucks, boats, trains, and planes), or fixed, as desired. For example, FIG. 1 illustrates user terminal 124a as a fixed telephone or data transceiver, user terminal 124b as a hand-held device, and user terminal 124c as a portable vehicle-mounted device. Wireless communication devices or terminals 124 are also sometimes referred to as mobile wireless terminals, user terminals, mobile wireless communication devices, subscriber units, mobile units, mobile stations, mobile radios, or simply "users," "mobiles," "terminals," or "subscribers" in some communication systems, depending on preference.

User terminals 124 engage in wireless communications with other elements in WCS 100 through CDMA communications systems. However, the present invention may be employed in systems that employ other communications techniques, such as time division multiple access (TDMA), and frequency division multiple access (FDMA), or other waveforms or techniques listed above (WCDMA, CDMA2000 . . . ).

Generally, beams from a beam source, such as base station 112 or satellites 116, cover different geographical areas in predefined patterns. Beams at different frequencies, also referred to as CDMA channels, frequency division multiplexed (FDM) channels, or "sub-beams," can be directed to overlap the same region. It is also readily understood by those skilled in the art that beam coverage or service areas for multiple satellites, or antenna patterns for multiple base stations, might be designed to overlap completely or partially in a given region depending on the communication system design and the type of service being offered, and whether space diversity is being achieved.

FIG. 1 illustrates several exemplary signal paths. For example, communication links 130a-c provide for the exchange of signals between base station 112 and user terminals 124. Similarly, communications links 138a-d provide for the exchange of signals between satellites 116 and user terminals 124. Communications between satellites 116 and gateways 120 are facilitated by communications links 146a-d.

User terminals 124 are capable of engaging in bi-directional communications with base station 112 and/or satellites 116. As such, communications links 130 and 138 each include a forward link and a reverse link. A forward link conveys information signals to user terminals 124. For terrestrial-based communications in WCS 100, a forward link conveys information signals from base station 112 to a user terminal 124 over a link 130. A satellite-based forward link in the context of WCS 100 conveys information from a gateway 120 to a satellite 116 over a link 146 and from the satellite 116 to a user terminal 124 over a link 138. Thus, terrestrial-based forward links typically involve a single wireless signal path between the user terminal and base station, while satellite-based forward links typically involve two or more wireless signal paths between the user terminal and a gateway through at least one satellite (ignoring multipath).

In the context of WCS 100, a reverse link conveys information signals from a user terminal 124 to either a base station 112 or a gateway 120. Similar to forward links in WCS 100, reverse links typically require a single wireless signal path for terrestrial-based communications and two wireless signal paths for satellite-based communications. WCS 100 may feature different communications offerings across these forward links, such as low data rate (LDR) and high data rate (HDR) services. An exemplary LDR service provides forward links having data rates from 3 kilobits per second (kbps) to 9.6 kbps, while an exemplary HDR service supports typical data rates as high as 604 kbps and higher.

As described above, WCS 100 performs wireless communications according to CDMA techniques. Thus, signals transmitted across the forward and reverse links of links 130, 138, and 146 convey signals that are encoded, spread, and channelized according to CDMA transmission standards. In addition, block interleaving can be employed for these forward and reverse links. These blocks are transmitted in frames having a predetermined duration, such as 20 milliseconds.

Base station 112, satellites 116, and gateways 120 may adjust the power of the signals that they transmit over the forward links of WCS 100. This power (referred to herein as forward link transmit power) may be varied according to user terminal 124 and according to time. This time varying feature may be employed on a frame-by-frame basis. Such power adjustments are performed to maintain forward link bit error rates (BER) within specific requirements, reduce interference, and conserve transmission power.

User terminals 124 may adjust the power of the signals that they transmit over the reverse links of WCS 100, under the control of gateways 120 or base stations 112. This power (referred to herein as reverse link transmit power) may be varied according to user terminal 124 and according to time. This time varying feature may be employed on a frame-by-frame basis. Such power adjustments are performed to maintain reverse link bit error rates (BER) within specific requirements, reduce interference, and conserve transmission power.

Examples of techniques for exercising power control in such communication systems are found in U.S. Pat. Nos. 5,383,219, entitled "Fast Forward Link Power Control In A Code Division Multiple Access System," U.S. Pat. No. 5,396,516, entitled "Method And System For The Dynamic Modification Of Control Parameters In A Transmitter Power Control System," and U.S. Pat. No. 5,056,109, entitled "Method and Apparatus For Controlling Transmission Power In A CDMA Cellular Mobile Telephone System," which are incorporated herein by reference.

II. Mobile Wireless Terminal

Figure 2:
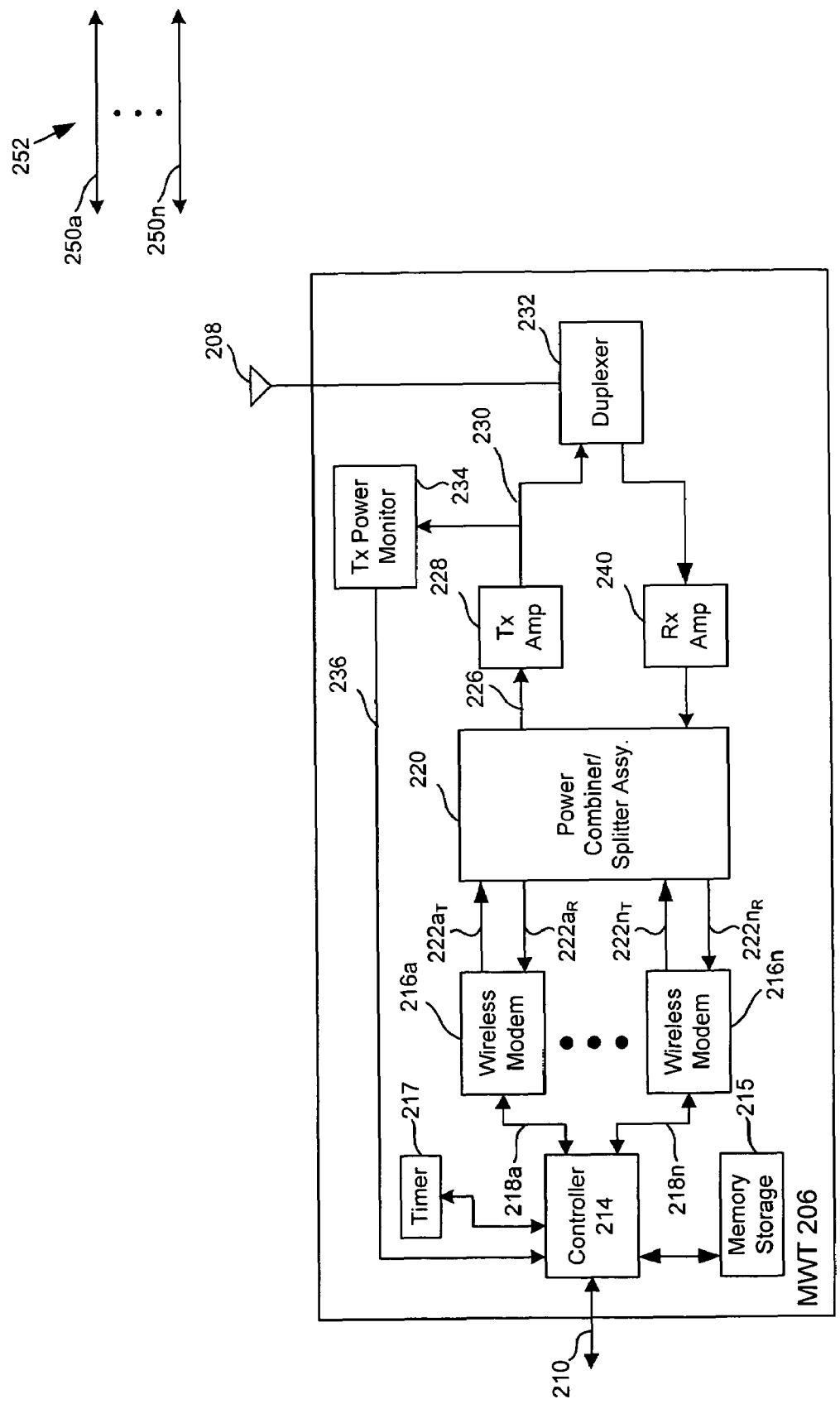
FIG. 2 is a block diagram of an example mobile wireless terminal.

FIG. 2 is a block diagram of an example MWT 206 constructed and operated in accordance with the principles of the present invention. MWT 206 communicates wirelessly with a base station or gateway (referred to as a remote station), not shown in FIG. 2. Also, MWT 206 may communicate with a user terminal. MWT 206 receives data from external data sources/sinks, such as a data network, data terminals, and the like, over a communication link 210, such as an ethernet link, for example. Also, MWT 206 sends data to the external data sources/sinks over communication link 210.

MWT 206 includes an antenna 208 for transmitting signals to and receiving signals from the remote station. MWT 206 includes a controller (that is, one or more controllers) 214 coupled to communication link 210. Controller 214 exchanges data with a memory/storage unit 215, and interfaces with a timer 217. Controller 214 provides data-to-be-transmitted to, and receives data from, a plurality of wireless modems 216a-216n over a plurality of corresponding bi-directional data links 218a-218n between controller 214 and modems 216. Data connections 218 may be serial data connections. The number N of modems that may be used can be one of several values, as desired, depending on known design issues such as complexity, cost, and so forth. In an example implementation, N=16.

Wireless modems 216a-216n provide RF signals $222a_T$-$222n_T$ to and receive RF signals $222a_R$-$222n_R$ from a power combiner/splitter assembly 220, over a plurality of bi-directional RF connections/cables between the modems and the power combiner/splitter assembly. In a transmit (that is, reverse link) direction, a power combiner included in assembly 220 combines together the RF signals received from all of modems 216, and provides a combined (that is, aggregate) RF transmit signal 226 to a transmit power amplifier 228. Transmit power amplifier 228 provides an amplified, aggregate RF transmit signal 230 to a duplexer 232. Duplexer 232 provides the amplified, aggregate RF transmit signal to antenna 208. In MWT 206, duplexing may be achieved by means other than duplexer 232, such as using separate transmit and receive antennas. Also, a power monitor 234, coupled to an output of power amplifier 228, monitors a power level of amplified, aggregate transmit signal 230. Power monitor 234 provides a signal 236 indicating the power level of amplified, aggregate transmit signal 230 to controller 214. In an alternative arrangement of MWT 206, power monitor 234 measures the power level of aggregate signal 226 at the input to transmit amplifier 228. In this alternative arrangement, the aggregate transmit power limit of MWT 206 is specified at the input to transmit amplifier 228 instead of at its output, and the methods of the present invention, described below, take this into account.

In a receive (that is, forward link) direction, antenna 208 provides a received signal to duplexer 232. Duplexer 232 routes the received signal to a receive amplifier 240. Receive amplifier 240 provides an amplified received signal to assembly 220. A power splitter included in assembly 220 divides the amplified received signal into a plurality of separate received signals and provides each separate signal to a respective one of the modems 216.

MWT 206 communicates with the remote station over a plurality of wireless CDMA communication links 250a-250n established between MWT 206 and the remote station. Each of the communication links 250 is associated with a respective one of modems 216. Wireless communication links 250a-250n can operate concurrently with one another. Each of wireless communication links 250 supports wireless traffic channels for carrying data between MWT 206 and the remote station in both forward and reverse link directions. The plurality of wireless communication channels 250 form part of an air interface 252 between MWT 206 and the remote station.

In the present embodiment, MWT 206 is constrained to operate under an aggregate transmit power limit (APL) at the output of transmit amplifier 228. In other words, MWT 206 is required to limit the transmit power of signal 230 to a level that is preferably below the aggregate transmit power limit. All of modems 216, when transmitting, contribute to the aggregate transmit power of signal 230. Accordingly, the present invention includes techniques to control the transmit powers of modems 216, and thereby cause the aggregate transmit power of modems 216, as manifested in transmit signal 230, to be under the aggregate transmit power limit.

Over-driving transmit amplifier 228 causes the power level of signal 230 to exceed the aggregate transmit power limit. Therefore, the present invention establishes individual transmit power limits (also referred to as transmit limits) for each of modems 216. The individual transmit power limits are related to the aggregate transmit power limit in such a way as to prevent modems 216 from collectively over-driving transmit amplifier 228. During operation of MWT 206, the present invention detects over-limit ones of modems 216. In response to detecting the over-limit modem(s), controller 214 adjusts the individual transmit power limits in at least some of modems 216 based on the aggregate transmit power limit and respective transmit power estimates from modems 216, to cause each individual modem transmit power limit to track a corresponding individual modem transmit power. An objective is to maximize bandwidth (that is, transmit data rate) for a given aggregate transmit power limit by adjusting the individual modem transmit power limits. Further aspects of the present invention are described below.

Although MWT 206 is referred to as being mobile, it is to be understood that the MWT is not limited to a mobile platform or portable platforms. For example, MWT 206 may reside in a fixed base station or gateway. MWT 206 may also reside in a fixed user terminal 124a.

III. Modem

Figure 3:
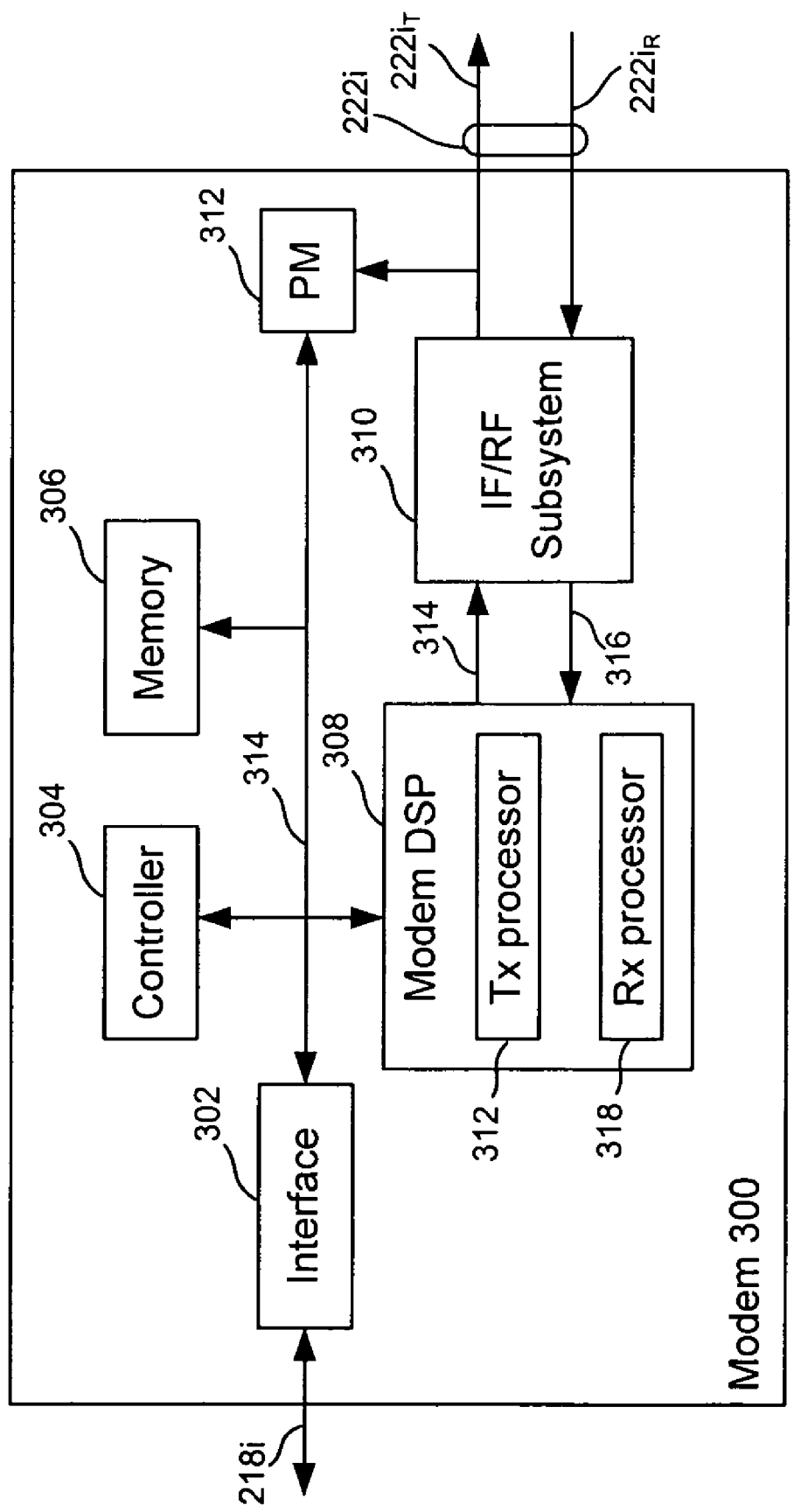
FIG. 3 is a block diagram of an example modem representative of individual modems of the mobile wireless terminal of FIG. 2.

FIG. 3 is a block diagram of an example modem 300 representative of each of modems 216. Modem 300 operates in accordance with CDMA principles. Modem 300 includes a data interface 302, a controller 304, a memory 306, a modem signal processor or module 308, such as one or more digital signal processors (DSP) or ASICs, an intermediate frequency IF/RF subsystem 310, and an optional power monitor 312, all coupled to one another over a data bus 314. In some systems, the modems do not comprise transmit and receive processor coupled in pairs as in a more traditional modem structure, but may use an array of transmitters and receivers or modulators and demodulates which are interconnected as desired to handle user communications, and one or more signals, or otherwise time shared among users.

In the transmit direction, controller 304 receives data-to-be-transmitted from controller 214 over data connection 218i (where i indicates any one of the modems 216a-216n), and through interface 302. Controller 304 provides the data-to-be-transmitted to modem processor 308. A transmit (Tx) processor 312 of modem processor 308 encodes and modulates the data-to-be-transmitted, and packages the data into data frames that are to be transmitted. Transmit processor 312 provides a signal 314 including the data frames to IF/RF subsystem 310. Subsystem 310 frequency up-converts and amplifies signal 314, and provides a resulting frequency up-converted, amplified signal $222i_T$ to power combiner/splitter assembly 220. Optional power meter 312 monitors a power level of signal $222i_T$ (that is, the actual transmit power at which modem 300 transmits the above-mentioned data frames). Alternatively, modem 300 can determine the modem transmit power based on gain/attenuator settings of IF/RF subsystem 310 and the data rate at which modem 300 transmits the data frames.

In the receive direction, IF/RF subsystem 310 receives a received signal $222i_R$ from power combiner/splitter assembly 220, frequency down-converts signal $222i_R$ and provides the resulting frequency down-converted signal 316, including received data frames, to a receive (Rx) processor 318 of modem processor 308. Receive processor 318 extracts data from the data frames, and then controller 304 provides the extracted data to controller 214, using interface 302 and data connection 218i.

Figure 4:
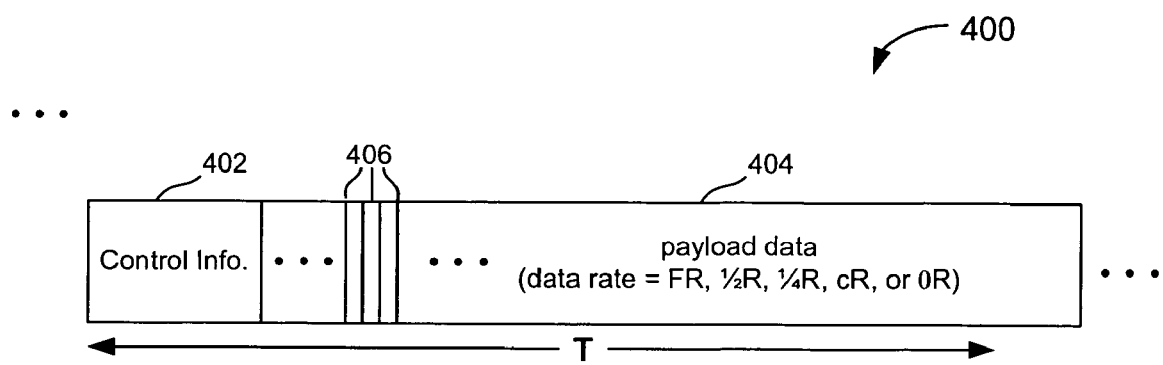
FIG. 4 is an illustration of an example data frame that may be transmitted or received by any one of the modems of FIGS. 2 and 3.

Modems 216 each transmit and receive data frames in the manner described above and further below. FIG. 4 is an illustration of an example data frame 400 that may be transmitted or received by any one of modems 216. Data frame 400 includes a control or overhead field 402 and a payload field 404. Fields 402 and 404 include data bits used to transfer either control information (402) or payload data (404). Control field 402 includes control and header information used in managing a communication link established between a respective one of modems 216 and the remote station. Payload field 404 includes payload data (bits 406), for example, data-to-be-transmitted between controller 214 and the remote station during a data call (that is, over the communication link established between the modem and the remote station). For example, data received from controller 214, over data link 218i, is packaged into payload field 404.

Data frame 400 has a duration T, such as 20 milliseconds, for example. The payload data in payload field 404 is conveyed at one of a plurality of data rates, including a maximum or full-rate (for example, 9600 bits-per-second (bps)), a half-rate (for example, 4800 bps), a quarter-rate (for example, 2400 bps), or an eighth-rate (for example, 1200 bps). Each of the modems 216 attempts to transmit data at the full-rate (that is, at a maximum data rate). However, an over-limit modem rate-limits, whereby the modem reduces its transmit data rate from the maximum rate to a lower rate, as will be discussed below. Also, each of the modems 216 may transmit a data frame (for example, data frame 400) without payload data. This is referred to as a zero-rate data frame.

In one modem arrangement, each of the data bits 406 within a frame carries a constant amount of energy, regardless of the transmit data rate. That is, within a frame, the energy-per-bit, $E_b$, is constant for all of the different data rates. In this modem arrangement, each data frame corresponds to an instantaneous modem transmit power that is proportional to the data rate at which the data frame is transmitted. Therefore, the lower the data rate, the lower the modem transmit power. When transferring data at lower rates the energy of each bit is generally spread out over time. That is, for half-rate the bit energy is spread out over twice the length of time, quarter-rate, four times the length of time, and so forth, By spreading the transmit energy across a data frame in this manner, no energy spikes are caused during portions of the frame which would exceed the allowed limit.

In addition, when transferring data at lower rates the energy of each bit is generally spread out over time. That is, for half-rate the bit energy is spread out over twice the length of time, quarter-rate, four times the length of time, and so forth, By spreading the transmit energy across a data frame in this manner, no energy spikes are caused during portions of the frame which would exceed the allowed limit.

Figure 5:
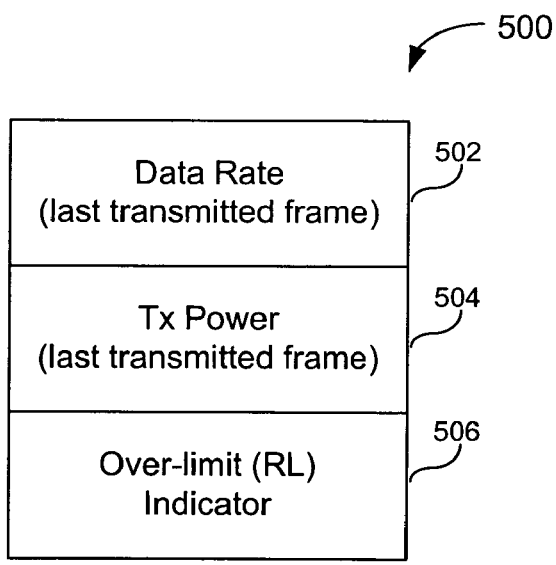
FIG. 5 is an illustration of an example status report from the modems of FIGS. 2 and 3.

Each of the modems 216 provides status reports to controller 214 over respective data connections 218. FIG. 5 is an illustration of an example status report 500. Status report 500 includes a modem data rate field 502, a modem transmit power field 504, and an optional over-limit (also referred to as a rate-limiting) indicator field 506. Each modem reports the data rate of the last transmitted data frame in field 502, and the transmit power of the last transmitted data frame in field 504. In addition, each modem can optionally report whether it is in a rate-limiting condition in field 506.

In another alternative modem arrangement, the modem can provide status signals indicating the over-limit/rate-limiting condition, the transmit power, and transmit data rate of the modem.

IV. Example Method

Figure 6:
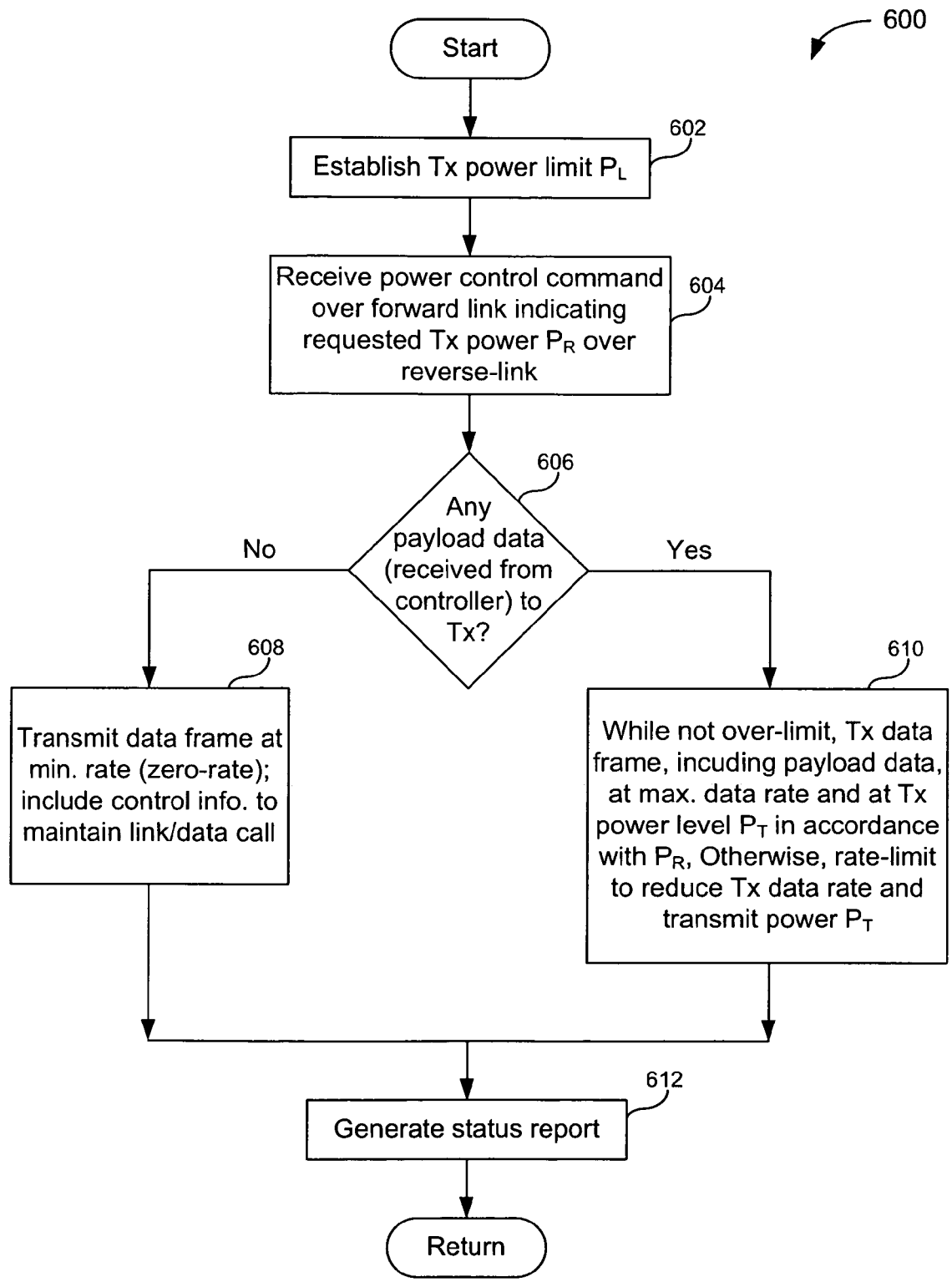
FIG. 6 is a flowchart of an example method performed by each of the modems of FIGS. 2 and 3.

FIG. 6 is a flowchart of an example method or process 600 representative of an operation of modem 300, and thus, of each of modems 216. Method 600 assumes a data call has been established between a modem (for example, modem 216a) and the remote station. That is, a communication link including a forward link and a reverse link has been established between the modem and the remote station.

At a first step 602, a transmit power limit $P_L$ is established in the modem (for example, in modem 216a).

At a next step 604, the modem receives a power control command from the remote station over the forward link indicating a requested transmit power PR at which the modem is to transmit data frames in the reverse link direction. This command may be in the form of an incremental power increase or decrease command.

At a decision step 606, the modem determines whether any payload data has been received from controller 214, that is, whether or not there is any payload data to transmit to the remote station. If not, processing proceeds to a next step 608. At step 608, the modem transmits a data frame at the zero-rate, that is, without payload data. The zero-rate data frame may include control/overhead information used to maintain the communication link/data call, for example. The zero-rate data frame corresponds to a minimum transmit power of the modem.

On the other hand, if there is payload data to transmit, then method processing (control) proceeds from step 606 to a next step 610. At step 610, the modem determines whether or not it is not over-limit, that is, whether the modem is under-limit. In one arrangement, determining whether or not the modem is under-limit includes determining whether the requested transmit power $P_R$ is less than the transmit power limit $P_L$. In this arrangement, the modem is considered over-limit when the requested transmit power $P_R$ is greater than or equal to $P_L$. In an alternative arrangement, determining whether or not the modem is under-limit includes determining whether an actual transmit power $P_T$ of the modem is less than the transmit power limit $P_L$. In this arrangement, the modem is considered over-limit when $P_T$ is greater than or equal $P_L$. The modem may use power monitor 312 in determining whether its transmit power $P_T$, for example, the transmit power of signal $222i_T$, is less than the transmit power limit $P_L$.

While the modem is not-over limit, the modem transmits a data frame, including payload data and control information, at a maximum data rate (for example, the full-rate) and at a transmit power level $P_T$ that is in accordance with the requested transmit power $P_R$. In other words, the modem transmit power $P_T$ tracks the requested transmit power $P_R$.

When $P_T$ or $P_R$ is equal to or greater than $P_L$, the modem is over-limit, and thus rate-limits from a current rate (for example, the full-rate) to a lower transmit data rate (for example, to the half-rate, quarter-rate, eighth-rate or even the zero-rate), thereby reducing the transmit power $P_T$ of the modem relative to when the modem was transmitting at the full-rate. Therefore, rate-limiting in response to either of the over-limit conditions described above is a form of modem self power-limiting, whereby the modem maintains its transmit power $P_T$ below the transmit power limit $P_L$. Also, the over-limit/rate-limiting condition, as reported in status report 500, indicates to controller 214 that the requested power $P_R$, or the actual transmit power $P_T$ in the alternative arrangement, is greater than or equal to the transmit power limit $P_L$. It should be appreciated that while the modem may be operating at the zero-rate in the transmit (that is, reverse link) direction, because it either is rate-limiting (for example, in step 610) or has no payload data to transmit (step 608), it may still receive full-rate data frames in the receive (that is, forward link) direction.

Although it can be advantageous for the modem to self rate-limit in response to the over-limit condition, an alternative arrangement of the modem does not rate-limit in this manner. Instead, the modem reports the over-limit condition to controller 214, and then waits for the controller to impose rate-limiting adjustments. A preferred arrangement uses both approaches. That is, the modem self rate-limits in response to the over-limit condition, and the modem reports the over-limit condition to controller 214, and in response, the controller imposes rate-limiting adjustments on the modem.

After both step 608 and step 610, the modem generates a status report (for example, status report 500) at a step 612, and provides the report to controller 214 over a respective one of data links 218.

V. Fixed Transmit Power Limit Embodiments

Figure 7:
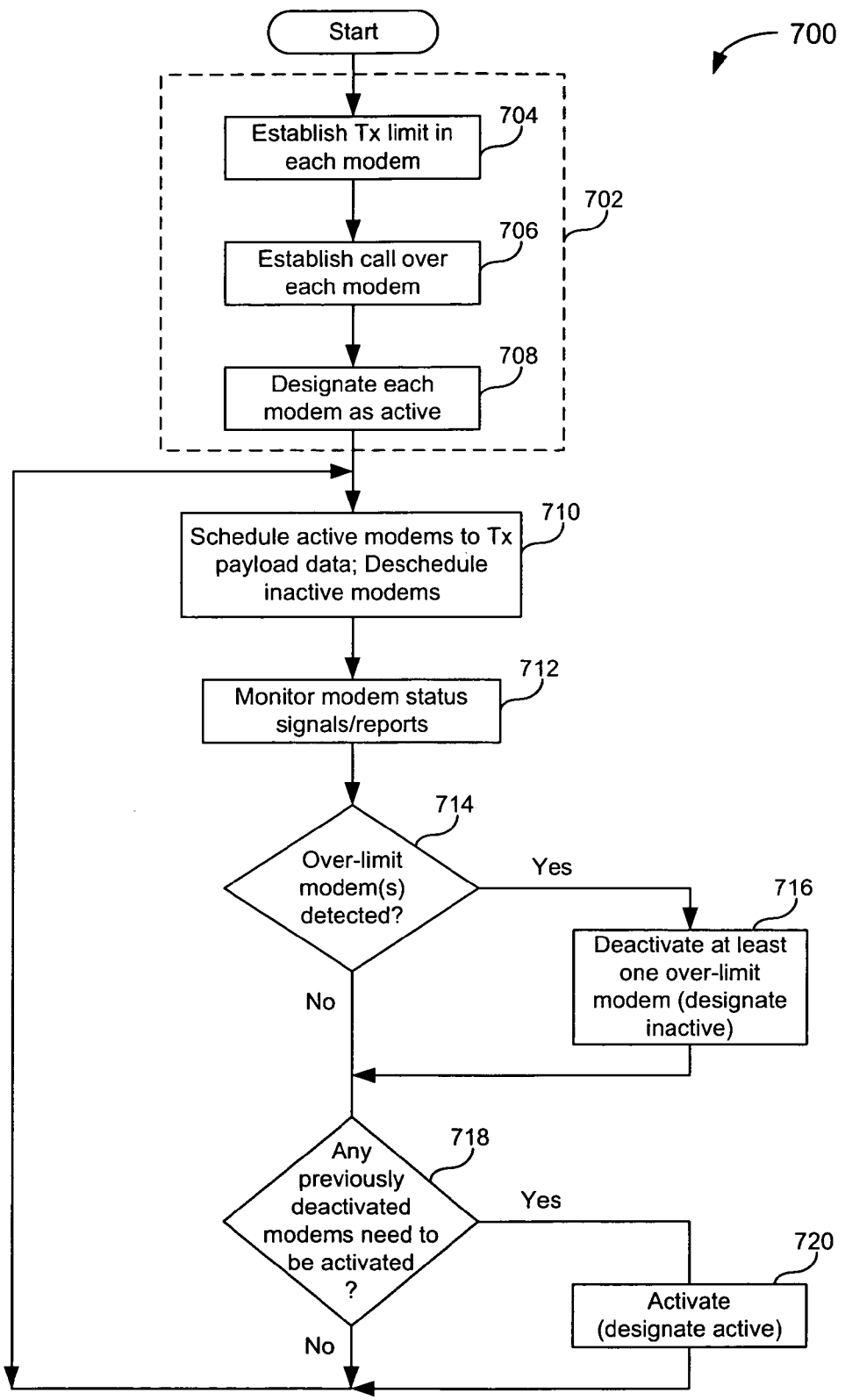
FIG. 7 is a flowchart of an example method performed by the mobile wireless terminal.

FIG. 7 is a flowchart of an example method performed by MWT 206, accordance with the present embodiments. Method 700 includes an initializing step 702. Step 702 includes further steps 704, 706, and 708. At step 704, controller 214 establishes an individual transmit power limit $P_L$ in each of modems 216. The transmit power limits are fixed over time in method 700.

At step 706, controller 214 establishes a data call over each of modems 216. In other words, a communication link, including both forward and reverse links, is established between each of the modems 216 and the remote station. The communication links operate concurrently with one another.

In an exemplary arrangement of the present invention, the communication links are CDMA based communication links.

In the embodiments, a modem may be designated as an active modem or as an inactive modem. Controller 214 can schedule active modems, but not inactive modems, to transmit payload data. Controller 214 maintains a list identifying currently active modems. At a step 708, controller 214 initially designates all of the modems as being active, by adding each of the modems to the active list, for example.

At a next step 710, assuming controller 214 has received data that needs to be transmitted to the remote station, controller 214 schedules each of the active modems to transmit payload data. In a first past through step 710, all of modems 216 are active (from step 708). However, in subsequent passes through step 710, some of modems 216 may be inactive, as will be described below.

Controller 214 maintains a queue of data-to-be-transmitted for each of the active modems, and supplies each data queue with data received from the external data sources over link 210. Controller 214 provides data from each data queue to the respective active modem. Controller 214 executes data-loading algorithms to ensure the respective data queues are generally, relatively evenly loaded, so that each active modem is concurrently provided with data-to-be-transmitted. After controller 214 provides data to each modem, each modem in turn attempts to transmit the data in data frames at the full-rate and in accordance with the respective requested transmit power $P_R$, as described above in connection with FIG. 6.

At step 710, controller 214 also de-schedules inactive modems by diverting data-to-be-transmitted away from the inactive modems and toward the active modems. However, there are no inactive modems in the first pass through step 710, since all of the modems are initially active after step 708, as mentioned above.

At a next step 712, controller 214 monitors the modem status reports from all of the inactive and active modems.

At a next step 714, controller 214 determines whether any of the modems 216 are over-limit, and thus rate-limiting, based on the modem status reports. If controller 214 determines that one or more (that is, at least one) of the modems are over-limit, then controller 214 deactivates only these over-limit modems, at a step 716. For example, controller 214 can deactivate an over-limit modem by removing it from the active list.

If none of the modems are determined to be over-limit at step 714, the method or processing proceeds to a step 718. Processing also proceeds to step 718 after any over-limit modems are deactivated in step 716. At step 718, controller 214 determines whether or not any of the modems previously deactivated at step 716 need to be activated (that is, reactivated). Several techniques for determining whether modems should be activated are discussed below. If the answer at step 718 is yes (modems need to be reactivated), then processing proceeds to a step 720, and controller 214 activates the previously deactivated modems that need to be activated, for example, by reinstating the modems on the active list.

If none of the previously deactivated modems need to be activated, then processing proceeds from step 718 back to step 710. Also, processing proceeds from step 720 to step 710. Steps 710 through 720 are repeated over time, whereby over-limit ones of modems 216 are deactivated at step 716 and then reactivated at step 718 as appropriate, and correspondingly de-scheduled and re-scheduled at step 710.

When an over-limit modem is deactivated at step 716 (that is, becomes inactive), and remains deactivated through step 718, the modem will be descheduled in the next pass through step 710. In other words, controller 214 will no longer provide data to the deactivated modem. Instead, controller 214 will divert data to active modems. If it is assumed that the data call associated with the deactivated modem has not been torn-down (that is, terminated), then de-scheduling the modem at step 710 will cause the deactivated modem to have no payload data to transmit, and will thus cause the modem to operate at the zero-rate and at a corresponding minimum transmit power level on the reverse link (see steps 606 and 608, described above in connection with FIG. 6). This keeps the data call alive or active on the deactivated/descheduled modem, so the modem can still receive full-rate data frames on the forward link. When a data call associated with a modem is torn-down, that is, terminated or ended, the modem stops transmitting and receiving data altogether.

Deactivating the over-limit modem at step 716 ultimately causes the modem to reduce its transmit data rate and corresponding transmit power in the reverse link direction. In this manner, controller 214 individually controls the modem transmit power limits (and thus modem transmit powers), and as a result, can maintain the aggregate transmit power of signal 230 at a level below the aggregate transmit power limit of MWT 206.

Alternative arrangements of method 700 are possible. As described above, deactivating step 716 includes deactivating an over-limit modem by designating the modem as inactive, for example, by removing the modem from the active list. Conversely, activating step 720 includes reinstating the deactivated modem to the active list. In an alternative arrangement of method 700, deactivating step 716 further includes tearing-down (that is, terminating) the data call (that is, the communication link) associated with the over-limit modem. Also in this alternative arrangement, activating step 720 further includes establishing another data call over the previously deactivated modem, so that the modem can begin to transmit data to and receive data from the remote station.

In another alternative arrangement of method 700, deactivating step 716 further includes deactivating all of the modems, whether over-limit or not over-limit, when any one of the over-limit modems is detected at step 714. In this arrangement, deactivating the modems may include designating all of the modems as inactive, and may further include tearing-down all of the data calls associated with the modems.

Figure 8:
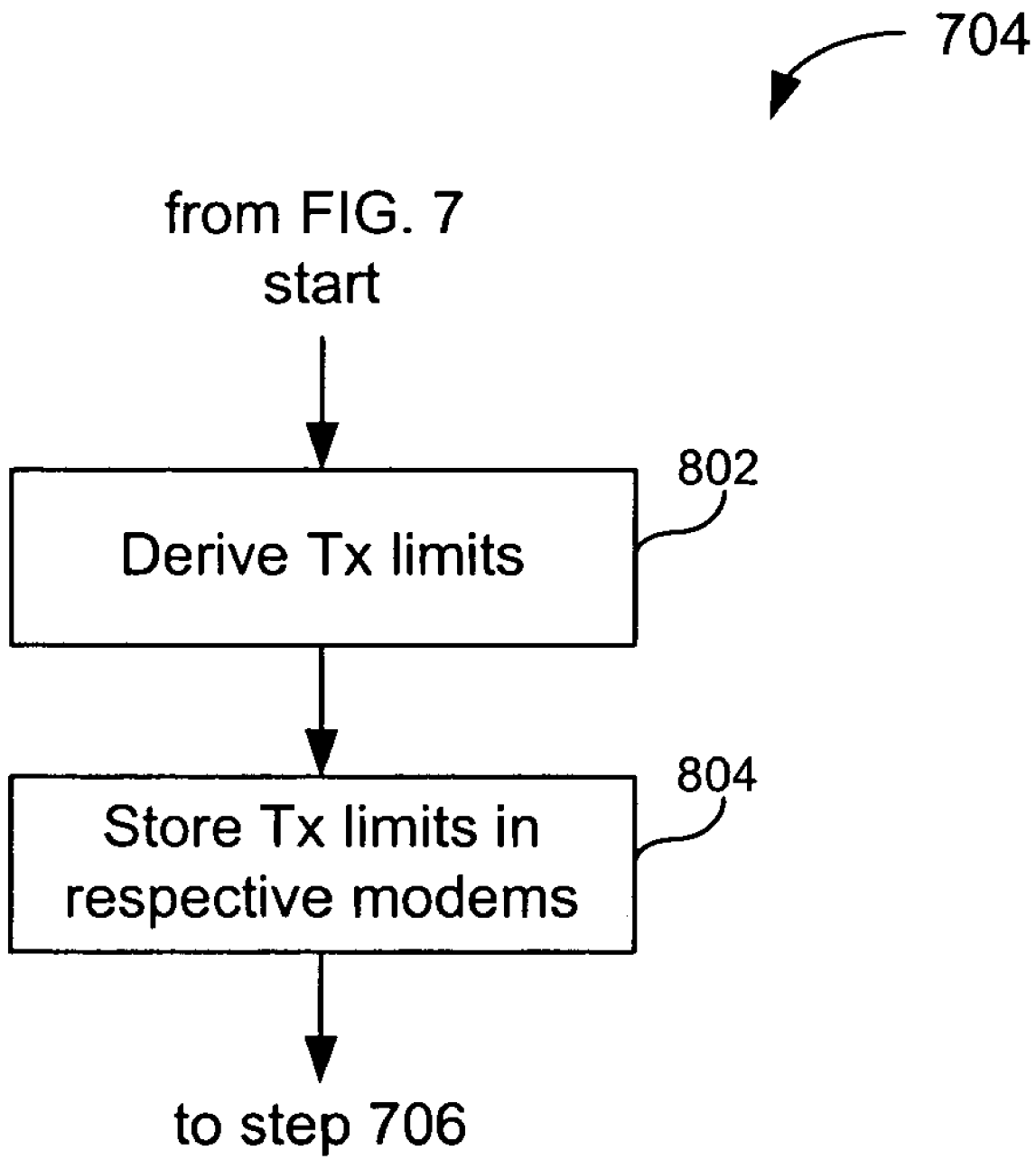
FIG. 8 is a flowchart expanding on the method of FIG. 7.

FIG. 8 is a flowchart expanding on transmit limit establishing step 704 of method 700. At a first step 802, controller 214 derives the transmit power limit for each of modems 216. For example, controller 214 may calculate the transmit power limits, or simply access predetermined limits stored in a memory look-up table. At a next step 804, controller 214 provides each of the modems 216 with a respective one of the transmit power limits, and in response, the modems store their respective transmit power limits in their respective memories.

Figure 9:
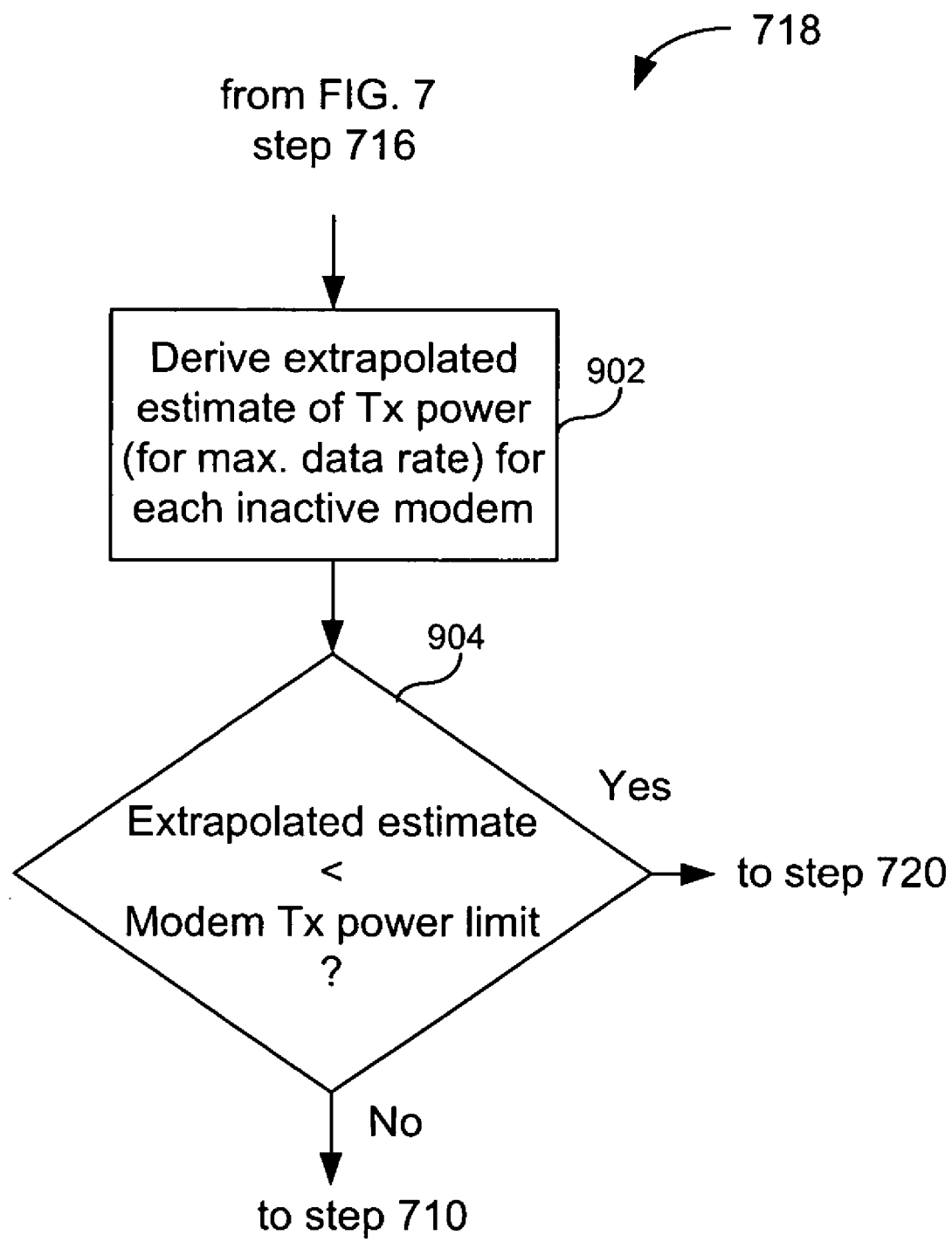
FIG. 9 is a flowchart expanding on the method of FIG. 7.

FIG. 9 is a flowchart expanding on determining step 718 of method 700. Controller 214 monitors (at step 712, for example) the respective reported transmit powers of the deactivated/inactive modems that are transmitting at the zero-rate. At a step 902, controller 214 derives, from the reported modem transmit powers, respective extrapolated modem transmit powers representative of when the modems transmit at the maximum transmit data rate.

At a next step 904, controller 214 determines whether each extrapolated transmit power is less than the respective modem transmit power limit $P_L$. If yes, then processing proceeds to step 720 where the respective modem is activated, because it is likely the modem will not exceed the power limit. If not, the modem remains deactivated, and flow of the method proceeds back to step 710.

Figure 10:
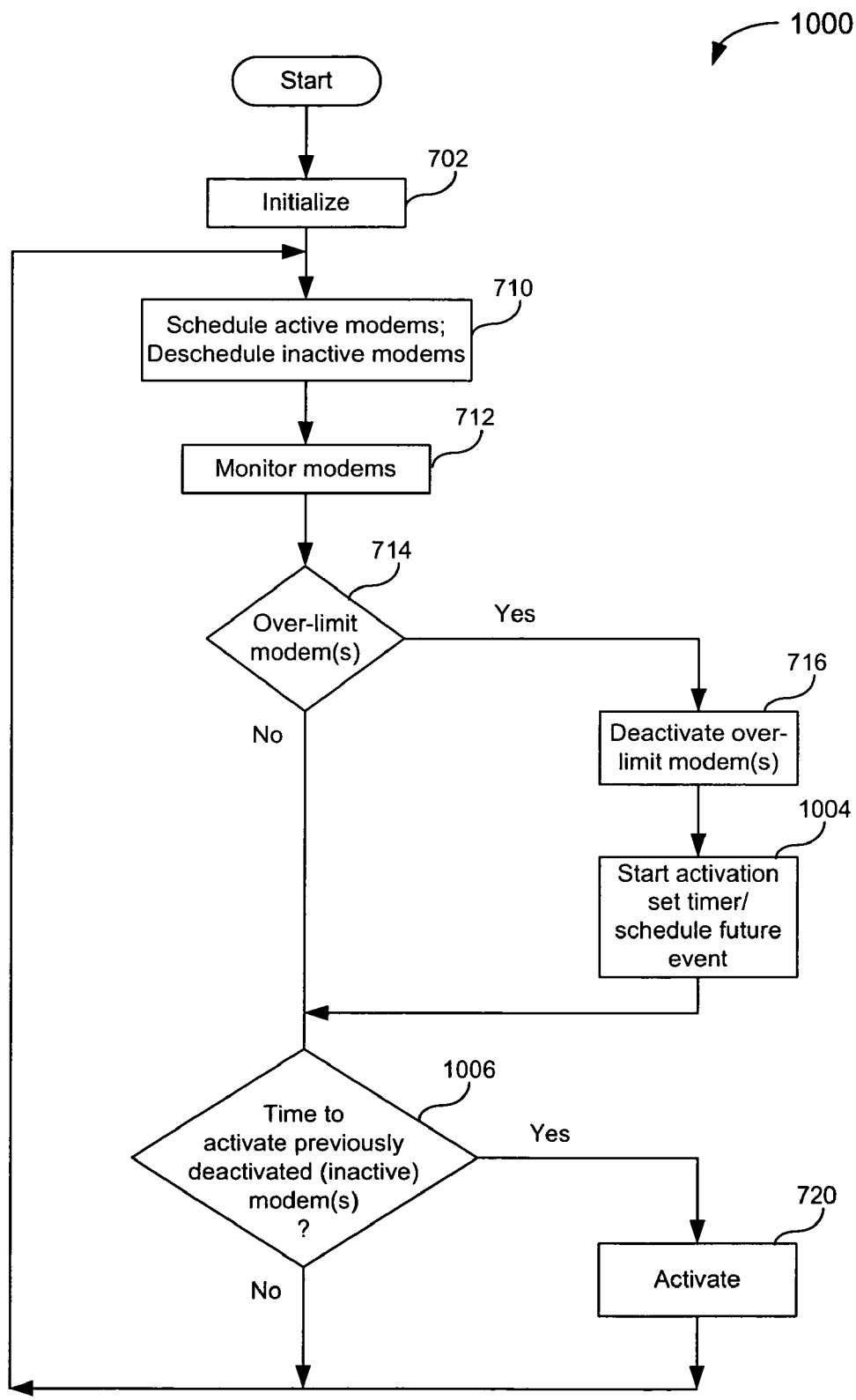
FIG. 10 is a flowchart of another example method performed by the mobile wireless terminal.

FIG. 10 is a flowchart of another example method 1000 performed by MWT 206. Method 1000 includes many of the method steps described previously in connection with FIG. 7, and such method steps will not be described again. However, method 1000 includes a new step 1004 following step 716, and a corresponding determining step 1006. At step 1004, controller 214 initiates an activation timeout period (for example, using timer 217) corresponding to each modem deactivated at step 716. Alternatively, controller 214 can schedule a future activation time/event corresponding to each modem deactivated in step 716.

At determining step 1006, controller 214 determines whether it is time to activate any of the previously deactivated modems. For example, controller 214 determines whether any of the activation timeout periods have expired, thereby indicating it is time to activate the corresponding deactivated modem. Alternatively, controller 214 determines whether the activation time/event scheduled at step 1004 has arrived.

Alternative arrangements of method 1000, similar to the alternative arrangements discussed above in connection with method 700, are also envisioned.

VI. Fixed Transmit Power Limit Arrangements

1. Uniform Limits

Figure 11:
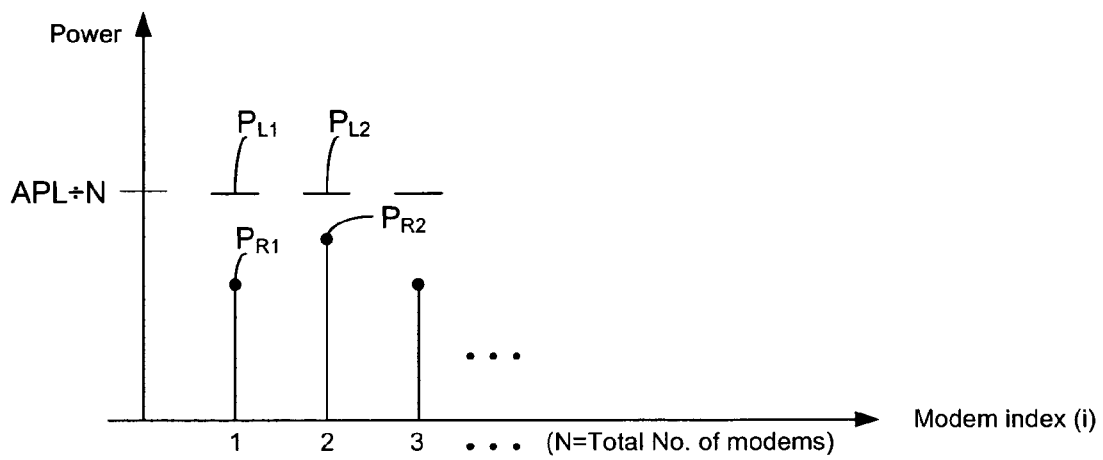
FIG. 11 is an example plot of Power versus Modem index(i) identifying respective ones of the modems of FIG. 2, wherein uniform modem transmit power limits are depicted.

In one fixed limit arrangement, a uniform set of fixed transmit power limits is established across all of modems 216. That is, each modem has the same transmit power limit as each of the other modems. FIG. 11 is an example plot of Power versus Modem index(i) identifying respective ones of the modems 216, wherein uniform, modem transmit power limits $P_{Li}$ are depicted. As depicted in FIG. 11, modem(1) corresponds to power limit $P_{L1}$, modem(2) corresponds to power limit $P_{L2}$, and so on.

In one arrangement of uniform limits, each transmit power limit $P_L$ is equal to the aggregate transmit power limit APL divided by the total number N of modems 216. Under this arrangement of uniform limits, when all of the modems have respective transmit powers equal to their respective transmit power limits, the aggregate transmit power for all of the modems will just meet, and not exceed, the APL. An example APL in the present invention is approximately 10 or 11 decibel-Watts (dBW).

FIG. 11 also represents an example transmit scenario for MWT 206. Depicted in FIG. 11 are representative, requested modem transmit powers $P_{R1}$ and $P_{R2}$ corresponding to modem(1) and modem(2). The example transmit scenario depicted in FIG. 11 corresponds to the scenario in which all of the requested modem transmit powers are below the respective, uniform transmit power limits. In this situation, none of the modems are over-limit, and thus rate-limiting.

Figure 12:
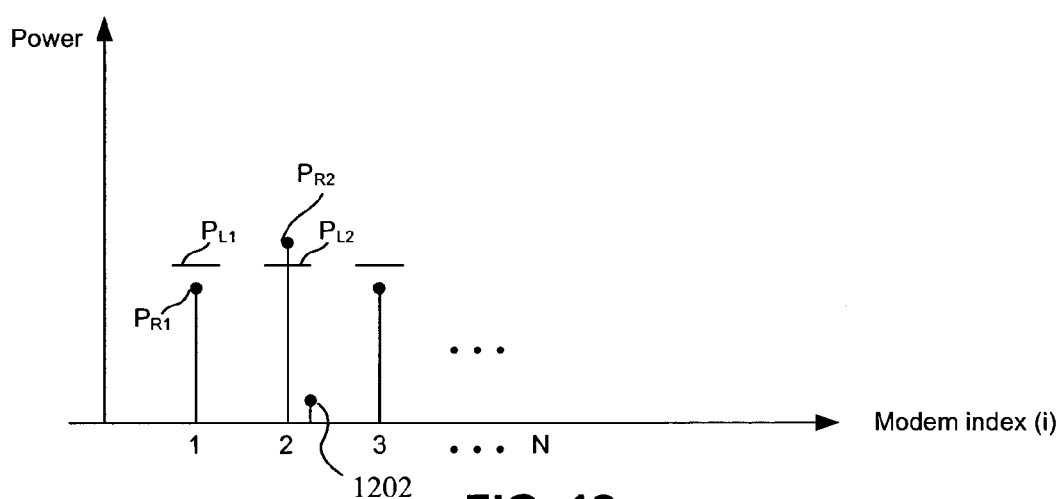
FIG. 12 is another example transmit scenario similar to FIG. 11.

FIG. 12 is another example transmit scenario similar to FIG. 11, except that modem(2) has a requested power $P_{R2}$ exceeding respective transmit power limit $P_{L2}$. Therefore, modem(2) is over-limit, and thus rate-limiting. Since modem(2) is over-limit, controller 214 deactivates modem (2) in accordance with method 700 or method 1000, thereby causing modem(2) to transmit at a zero-data rate, and at a correspondingly reduced transmit power level 1202.

2. Tapered Limits

Figure 13:
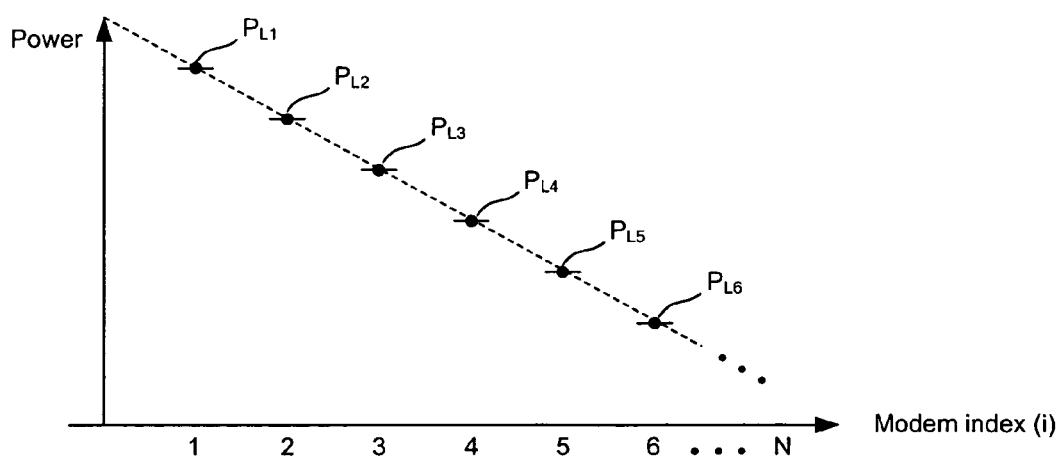
FIG. 13 is an illustration of an alternative, tapered arrangement for the modem transmit power limits.

FIG. 13 is an illustration of an alternative, tapered arrangement for the fixed modem transmit power limits. As depicted, the tapered arrangement includes progressively decreasing transmit power limits $P_{Li}$ in respective successive ones of the N modems, where i=1 . . . N. For example, transmit power limit $P_{L1}$ for modem(1) is less than transmit power limit $P_{L2}$ for modem(2), which is less than transmit power limit $P_{L3}$, and so on down the line.

In one tapered arrangement, each of the transmit power limits $P_{Li}$ is equal to the APL divided by the total number of modems having transmit power limits greater than or equal to $P_{Li}$. For example, transmit power limit $P_{L5}$ is equal to the APL divided by five (5), which is the number of modems having transmit power limits greater than or equal to $P_{L5}$. In another tapered arrangement, each transmit power limit $P_{Li}$ is equal to the transmit power limit mentioned above (that is, the APL divided by the total number of modems having transmit power limits greater than or equal to $P_{Li}$) less a predetermined amount, such as one, two or even three decibels (dB). This permits a safety margin in the event that the modems tend to transmit at an actual transmit power level that is slightly higher than the respective transmit power limits, before they are deactivated.

Assume a transmit scenario where all of the modems transmit at approximately the same power, and all of the transmit powers are increasing over time. Under the tapered arrangement, modem(N) rate-limits first, modem(N−1) rate limits next, modem(N−2) rate-limits third, and so on. In response, controller 214 deactivates/deschedules modem(N) first, modem(N−1) second, modem(N−3) third, and so on.

VII. Modem Calibration—Determining Gain Factors g(i)

As described above in connection with FIG. 2, each modem 216i generates a transmit signal $222i_T$ having a respective transmit power level. Also, each modem 216i generates a status report including a modem transmit power estimate $P_{Rep}(i)$ of the respective transmit power level. Each modem transmit signal $222i_T$ traverses a respective transmit path from modem 222i to the output of transmit amplifier 228. The respective transmit path includes RF connections, such as cables and connectors, power combiner/splitter assembly 220, and transmit amplifier 228. Therefore, transmit signal $222i_T$ experiences a respective net power gain or loss g(i) along the respective transmit path. An example gain for the above-mentioned transmit path is approximately 29 dB.

Accordingly, the gain or loss g(i) of the respective transmit path may cause the power level of respective transmit signal $222i_T$ at the output of modem 222i to be different from the transmit power level at the output of transmit amplifier 228. Therefore, the respective modem transmit power estimate $P_{Rep}(i)$ may not accurately represent the respective transmit power at the output of transmit amplifier 228. A more accurate estimate $P_O(i)$ of the transmit power at the output of transmit amplifier 228 (due to modem 222i), is the reported power $P_{Rep}(i)$ adjusted by the corresponding gain/loss amount g(i). Therefore, g(i) is referred to as a modem dependent gain correction factor g(i), or the modem gain factor g(i) for modem 222i.

When reported modem transmit power estimate $P_{Rep}(i)$ and modem gain correction factor g(i) both represent power terms (as expressed in decibels or Watts, for example), the corrected transmit power estimate $P_O(i)$ is given by:

$$P_O(i) = g(i) + P_{Rep}(i).$$

Alternatively, when reported transmit power estimate $P_{Rep}(i)$ and modem gain correction factor g(i), in Watts, for example, the transmit power $P_O(i)$ is given by:

$$P_O(i) = g(i) P_{Rep}(i).$$

It is useful to be able to calibrate MWT 206 dynamically, to determine the gain correction factors g(i) corresponding to all of the N modems. Once the factors g(i) are determined, they can be used to calculate more accurate individual and aggregate modem transmit power estimates from the modem transmit power reports.

Figure 14:
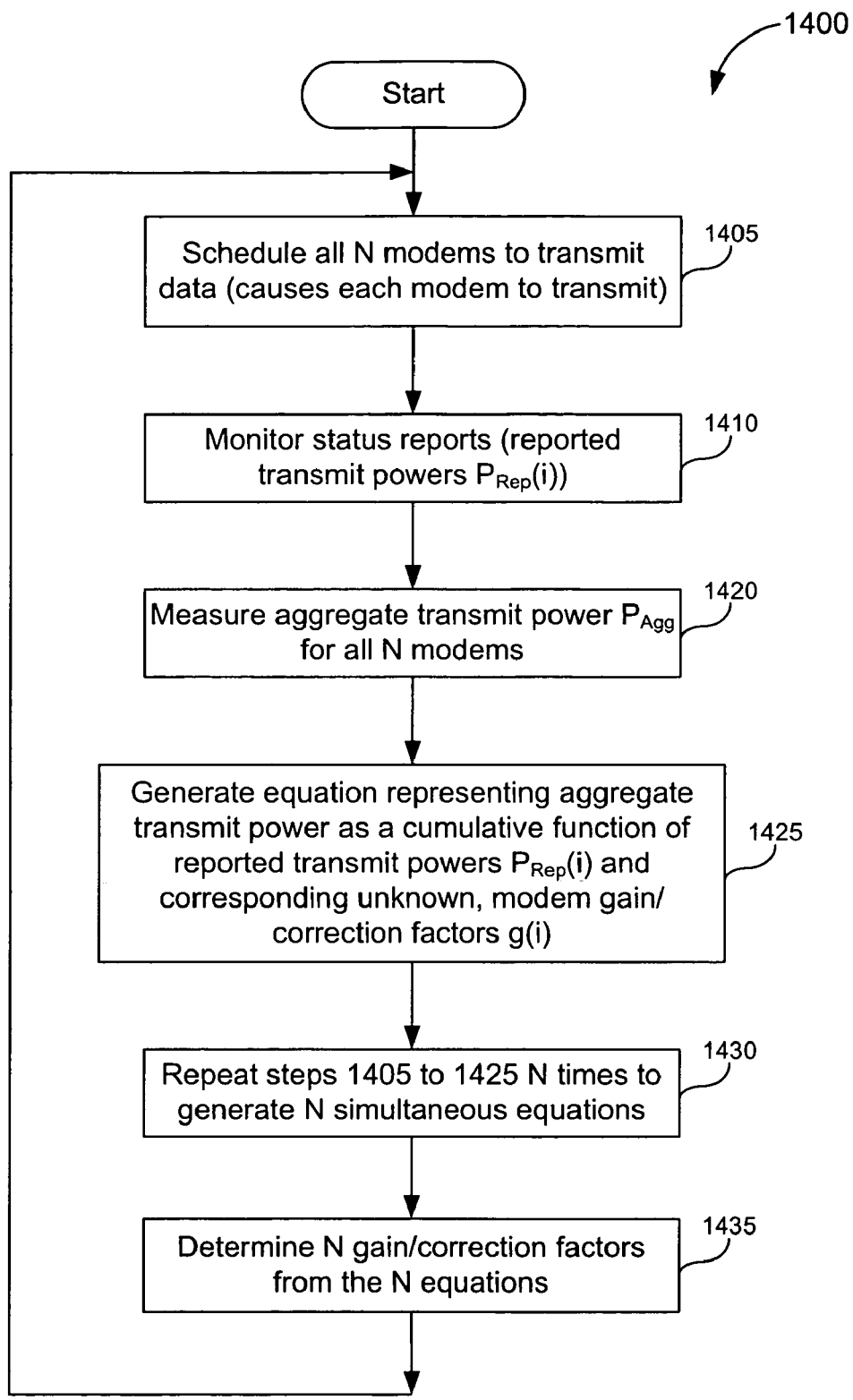
FIG. 14 is a flowchart of an example method of calibrating modems in the mobile wireless terminal of FIG. 2.

FIG. 14 is a flowchart of an example method of calibrating modems 216 in MWT 206. At a first step 1405, controller 214 schedules all N modems 216 to transmit data, so as to cause all of the modems to transmit data, concurrently.

At a next step 1410, controller 214 collects status reports 500, including respective reported transmit powers $P_{Rep}(i)$, where i represents modem i, and i=1 . . . N.

At a next step 1420, controller 214 receives an aggregate transmit power measurement $P_{Agg}$ for all of the N modems, for example, as determined by transmit power monitor 234.

At a next step 1425, controller 214 generates an equation representing the aggregate transmit power as a cumulative function of reported transmit powers $P_{Rep}(i)$ and corresponding unknown, modem dependent gain correction factors g(i). For example, aggregate transmit power $P_{Agg}$ is represented as:

$$P_{Agg} = \sum_{i=1}^{N_N} g(i) P_{Rep}(i).$$

At a next step 1430, previous steps 1405, 1410, 1420 and 1425 are repeated N times to generate N simultaneous equations in $P_{Rep}(i)$ and unknown gain correction factors g(i).

At a next step 1435, controller 214 determines the N gain correction factors g(i) by solving the N equations generated in step 1430. Determined gain correction factors g(i) are stored in memory 215 of MWT 206, and used as needed to adjust/correct modem transmit power estimates $P_{Rep}(i)$ in the methods of the invention, described below. Method 1400 may be scheduled to repeat periodically to update factors g(i) over time.

VIII. Methods Using Dynamically Updated Transmit Limits

1. Methods Using Energy-Per-Bit Determinations

Figure 15:
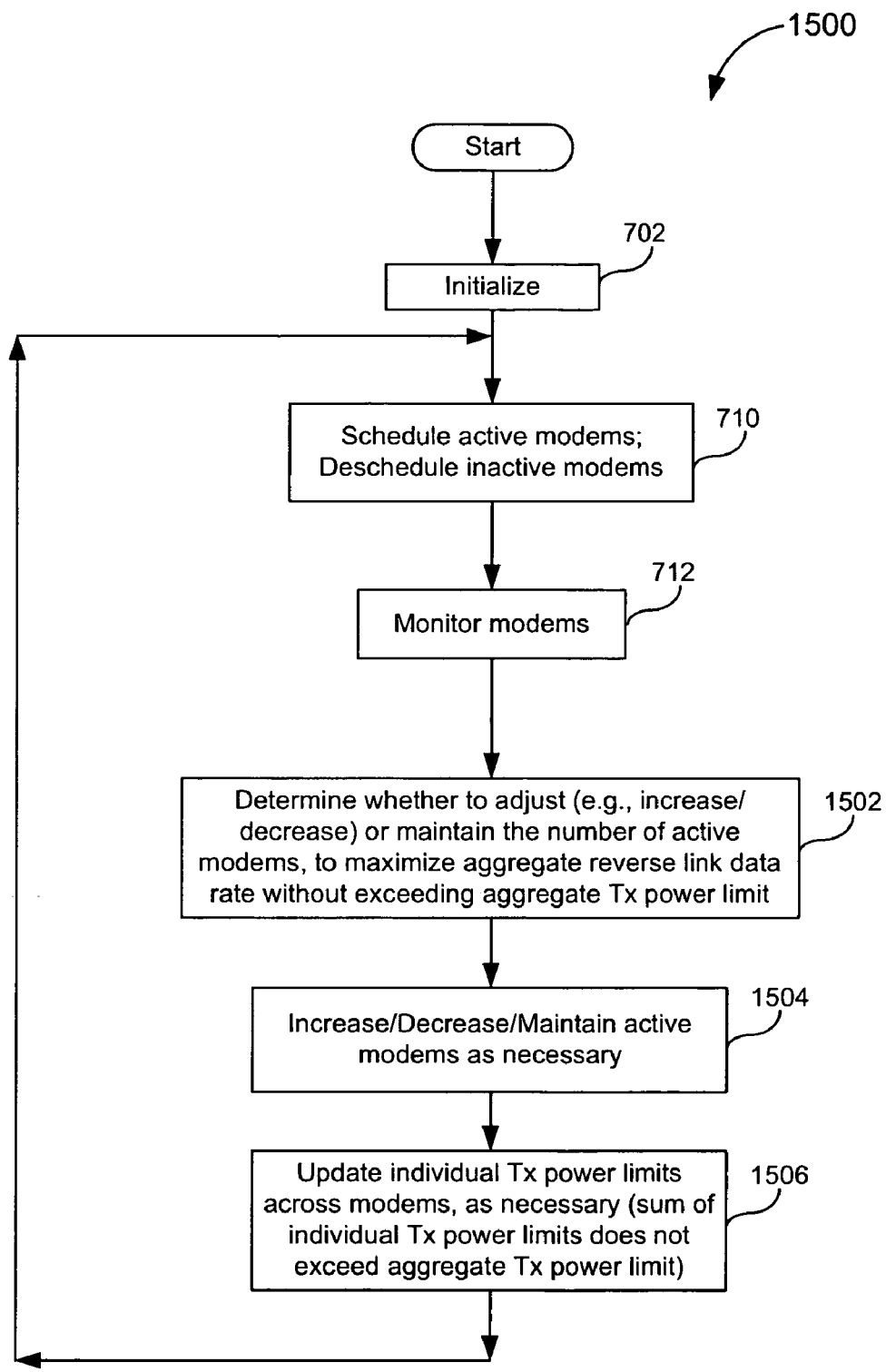
FIG. 15 is a flowchart of an example method of operating the mobile wireless terminal, using dynamically updated individual modem transmit power limits.

FIG. 15 is a flowchart of an example method 1500 of operating MWT 206, using dynamically updated individual modem transmit power limits. In method 1500, controller 214 initializes (step 702), schedules and deschedules active and inactive ones of modems 216 (step 710), and monitors status reports from the modems (step 712), as described above. At a next step 1502, controller 214 determines whether to modify (for example, increase or decrease) or maintain the number of active modems of MWT 206, in order to maximize an aggregate reverse link data rate (that is, the aggregate transmit data rate) without exceeding the aggregate transmit power limit of the MWT.

At a next step 1504, controller 214 increases, decreases, or maintains the number of active modems, as necessary, in accordance with step 1502. To increase the number of active modems, controller 214 adds one or more previously inactive modems to the active list. Conversely, to decrease the number of active modems, controller 214 deletes one or more previously active modems from the active list.

At a next step 1506, controller 214 updates/adjusts individual transmit power limits in at least some of modems 216, as necessary. Techniques for adjusting individual transmit power limits will be described further below. In step 1506, the individual transmit power limits are adjusted across modems 216 such that when all of the individual transmit limits are combined together into a combined transmit power limit, the combined transmit power limit does not exceed the aggregate transmit power limit of MWT 206. Exemplary transmit power limit arrangements that may be used with method 1500 are described later in connection with Table 1 and FIG. 19. A reason for varying modem transmit power limits in method 1500 is to avoid rate-limiting conditions in the modems. Also, a reason for deactivating modems (that is, decreasing the number of active modems) includes avoiding rate-limiting conditions so as to increase the overall transmit data rate on the reverse-link while operating under the aggregate transmit power limit.

At first blush, it might appear that deactivating modems would decrease, not increase, the transmit data rate. However, operating a number of modems, for example, 16 modems, at their rate-limited data rates (for example, at 4800 bps) achieves a lower effective data rate than operating a lesser number modems, for example 8 modems, at their full rates (for example, 9600 bps), even though each case may have the same aggregate transmit power. This is because the ratio of overhead information (used to manage the data calls, for example) to actual/useful data (used by end users, for example) is disadvantageously greater for rate limiting modems compared to non-rate limiting modems.

Figure 16:
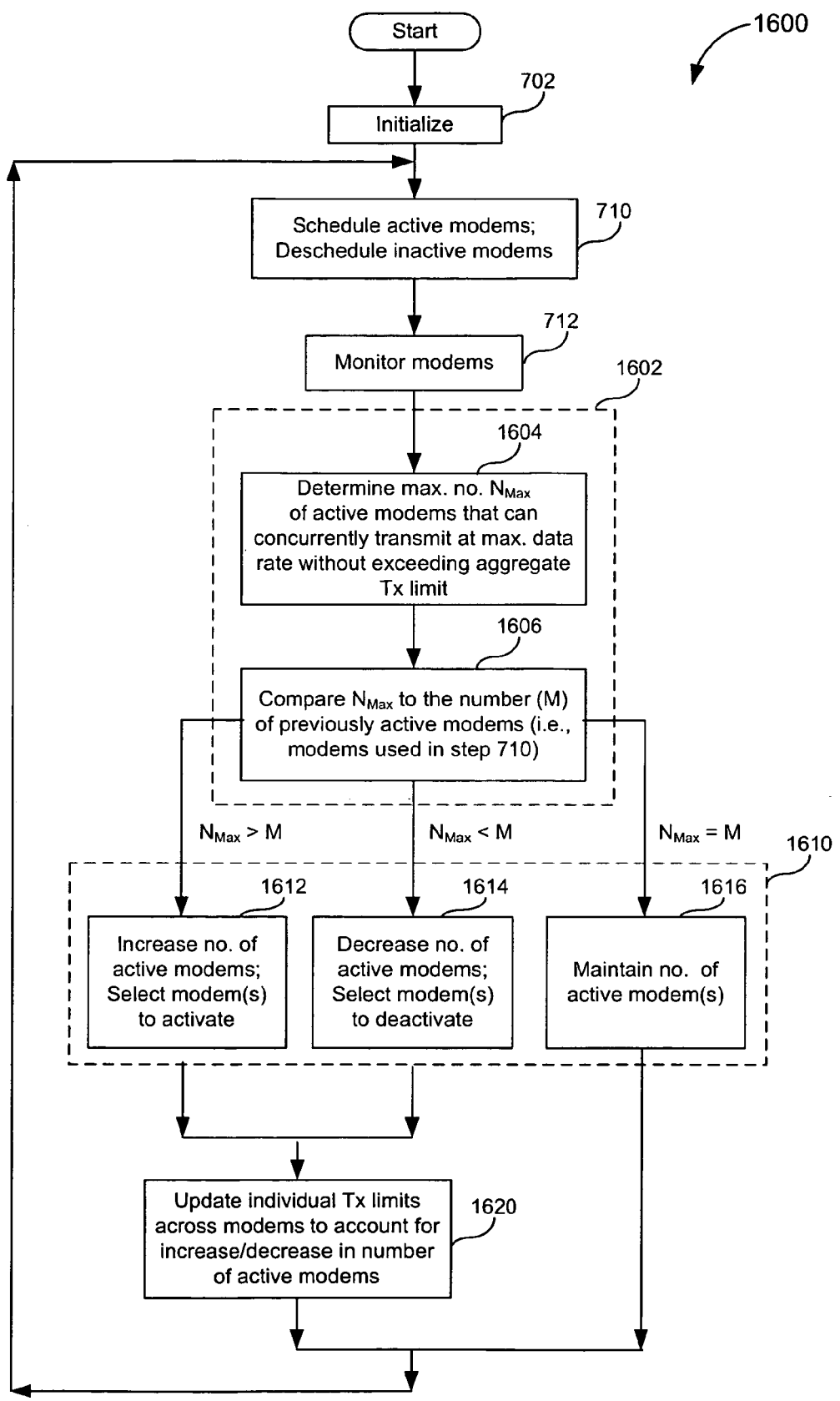
FIG. 16 is a flowchart of an example method expanding on the method of FIG. 15.

FIG. 16 is a flowchart of an example method 1600 expanding on method 1500. Method 1600 includes a step 1602 expanding on step 1502 of method 1500. Step 1602 includes further steps 1604 and 1606. At step 1604, controller 214 determines a maximum number $N_{Max}$ of active modems that can concurrently transmit at their respective maximum data rates (for example, at 9600 bps), without exceeding the aggregate transmit power limit of MWT 206. It is assumed that $N_{Max}$ is less than or equal to a total number N of modems 216.

At next step 1606, controller 214 compares the maximum number $N_{Max}$ to a number M of previously active modems (that is, the number of active modems used in a previous pass through step 710, described above).

A next step 1610, corresponding to step 1504 of method 1500, includes further steps 1612, 1614 and 1616. If the maximum number $N_{Max}$ of active modems from step 1604 is greater than the number M of previously active modems, the method flow proceeds from step 1606 to next step 1612. At step 1612, controller 214 increases the number M of active modems to the maximum number $N_{Max}$ of active modems. To do this, controller 214 selects an inactive modem to activate from among the N modems.

Alternatively, if the maximum number $N_{Max}$ of modems is less than M, then processing proceeds from step 1606 to step 1614. At step 1614, controller 214 decreases the number of active modems. To do this, controller 214 selects an active modem to deactivate. Steps 1612 and 1614 together represent an adjusting step (also referred to as a modifying step) where the number M of previously active modems is modified in preparation for a next pass through steps 710, 712, and so on.

Alternatively, if the maximum number $N_{Max}$ is equal to M, then processing proceeds from step 1606 to step 1616. In step 1616, controller 214 simply maintains the number of active modems at M, for the next pass through steps 710, 712, and so on.

Processing proceeds from both modifying steps 1612 and 1614 to a next, limit adjusting step 1620. At step 1620, controller 214 increases the individual transmit power limits in the one or more modems that were activated at step 1612. Conversely, controller 214 decreases the individual power limits in the one or more modems that were deactivated in step 1614.

The method proceeds from steps 1610 and 1620 back to scheduling/descheduling step 710, and the process described above repeats.

Figure 17:
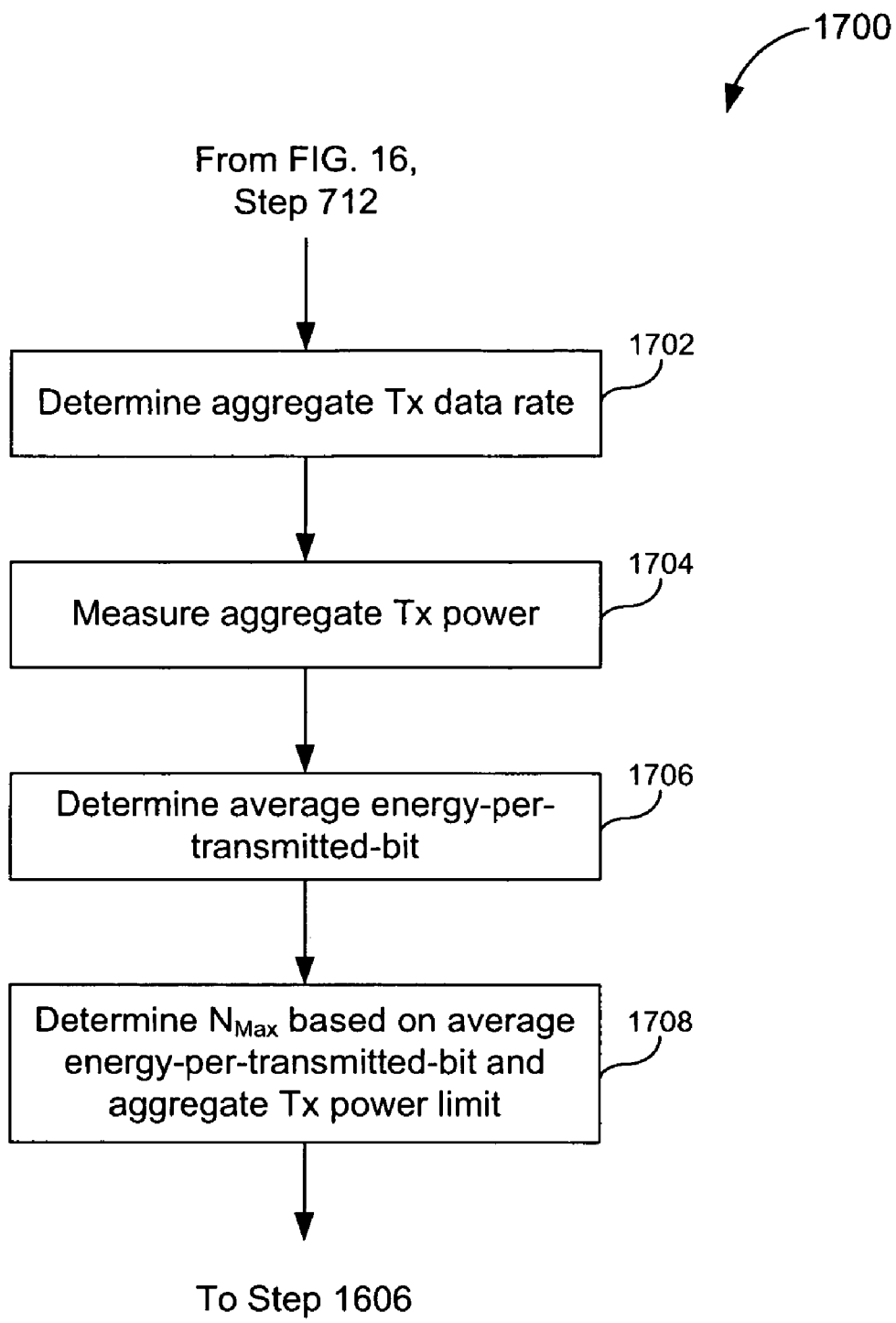
FIG. 17 is a flowchart of an example method of determining a maximum number of active modems using an average energy-per-transmitted-bit of the modems.

FIG. 17 is a flowchart of an example method 1700 of determining the maximum number $N_{Max}$ of active modems using an average energy-per-transmitted-bit of the N modems. Method 1700 expands on step 1604 of method 1600. At a first step 1702, controller 214 determines an aggregate transmit data rate based on the respective transmit data rates reported by the N modems. For example, controller 214 adds together all of the transmit data rates reported by the N modems in respective status reports 500.

At a next step 1704, controller 214 determines an aggregate power level of transmit signal 230, at the output of transmit amplifier 228. For example, controller 214 may receive transmit power measurements (signal 236) from transmit power monitor 234. Alternatively, controller 214 may aggregate individual modem transmit power estimates $P_{Rep}(i)$ (as corrected using factors g(i)) received from the individual modems in respective status reports 500.

At a next step 1706, controller 214 determines the average energy-per-transmitted-bit across the N modems 216 based on the aggregate data rate and the aggregate transmit power. In one arrangement of the embodiments, controller 214 determines the average energy-per-transmitted-bit in accordance the following relationships:

$$BE_{b\_avg}=P(t)\Delta t=E_T, \text{ and, therefore,}$$

$$E_{b\_avg}=(P(t)\Delta t)/B=E_T/B,$$

where:
 $\Delta t$ is a predetermined measurement time interval (for example, the duration of a transmitted frame, such as 20 ms),
 B is the aggregate data rate during time interval $\Delta t$,
 $E_{b\_avg}$ is the average energy-per-transmitted-bit during time interval $\Delta t$,
 P(t) is the aggregate transmit power during time interval $\Delta t$, and
 $E_T$ is the total energy of all the bits transmitted during time interval $\Delta t$.

At a next step 1708, controller 214 determines the maximum number $N_{Max}$ based on the average energy-per-transmitted-bit and the aggregate transmit power limit. In one arrangement, controller 214 determines the maximum number $N_{Max}$ in accordance with the following relationships:

$$((R_{max}N_{Max}+R_{min}(N-N_{Max}))E_{b\_avg}=APL, \text{ and therefore}$$

$$N_{Max}=((APL/E_{b\_avg})-P_{min}N)/(R_{max}-R_{min}),$$

where:
 APL is the aggregate transmit power limit of MWT 206 (for example, 10 or 11 decibel-Watts (dBW)),
 Rmax is a maximum data rate of the N modems (for example, 9600 bps),
 Rmin is a minimum data rate of the N modems (for example, 2400 bps), $E_{\_avg}$ is the average energy-per-transmitted-bit during time interval $\Delta t$, N is the total number of modems 216, and $N_{Max}$ is the maximum number of active modems to be determined.

Figure 18:
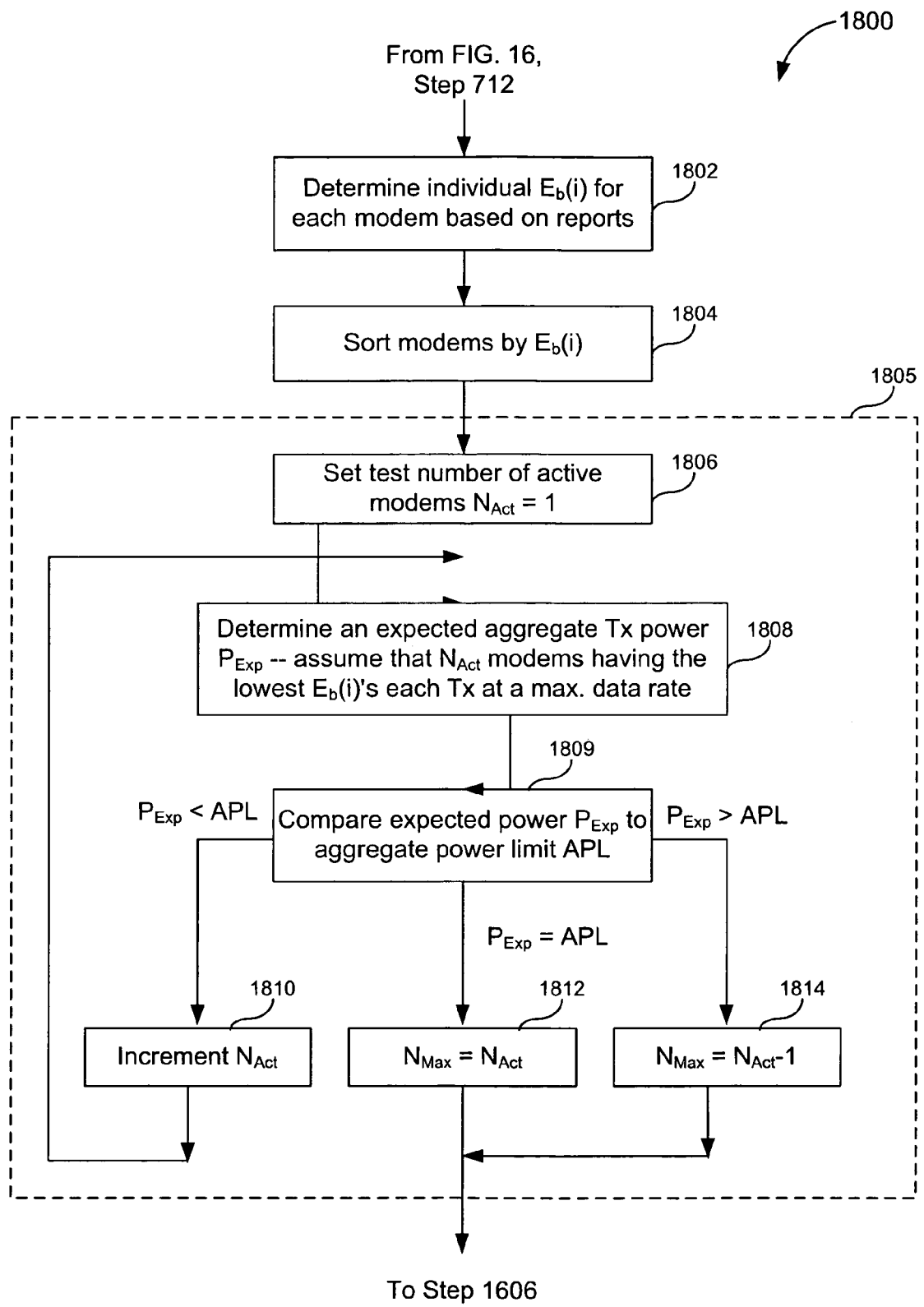
FIG. 18 is a flowchart of an example method of determining a maximum number of active modems, using an individual energy-per-transmitted-bit for each of the modems.

FIG. 18 is a flowchart of an example method 1800 of determining the maximum number $N_{Max}$ of active modems, using an individual energy-per-transmitted-bit for each of modems 216. Method 1800 expands on step 1604 of method 1600. At a first step 1802, controller 214 determines an individual energy-per-transmitted-bit $E_b(i)$ for each modem using modem reports 500. In one arrangement of the embodiment, controller 214 determines each energy-per-transmitted-bit $E_b(i)$ in accordance the following relationship:

$$E_b(i) = g(i) P_{Rep}(i) \Delta t / Bi,$$

where:

$\Delta t$ is a predetermined measurement time interval, $E_b(i)$ is the individual energy-per-transmitted-bit for modem i, where i=1 ... N, over time interval $\Delta t$, $P_{Rep}(i)$ is a reported modem transmit power (that is, a transmit power estimate for modem i), and g(i) is a modem dependent gain correction factor, also referred to as a gain calibration factor (described above in connection with FIG. 14), and Bi is the transmit data rate of modem i.

At a step 1804, controller 214 sorts the modems according to their respective energy-per-transmitted-bits $E_b(i)$.

At a next step 1805, controller 214 determines the maximum number $N_{Max}$ of active modems based on the individual modem energy-per-transmitted-bits, using an iterative process. In one embodiment, the iterative process of step 1805 determines the maximum number $N_{Max}$ of active modems that can be supported, using the following equation:

$$APL = \sum_{i=1}^{N_{Max}} P_{max} E_b(i) + \sum_{i=N_{Max}}^{N} P_{min} E_b(i),$$

where:

APL is the aggregate transmit power limit, $P_{max}$ is the maximum data rate for each modem, $P_{min}$ is the minimum data rate for each modem, and $E_b(i)$ is the individual energy-per-transmitted-bit for modem i.

Step 1805 is now described in further detail. A step 1806 within step 1805 is an initializing step in the iterative process, wherein modem 214 sets a test number $N_{Act}$ of active modems equal to one (1). Test number $N_{Act}$ represents a test, maximum number of active modems. At a next step 1808, modem 214 determines an expected transmit power $P_{Exp}$ using the test number $N_{Act}$ of modems. In step 1808, it is assumed that the test number $N_{Act}$ of modems having the lowest individual energy-per-transmitted-bits among the N modems each transmit at a maximum data rate (for example, 9600 bps). In the embodiment mentioned above, step 1808 determines the expected transmit power in accordance with the following equation:

$$P_{Exp} = \sum_{i=1}^{N_{act}} P_{max} E_b(i) + \sum_{i=N_{act}}^{N} P_{min} E_b(i),$$

At a next step 1809, controller 214 compares the expected transmit power $P_{EXP}$ to the APL. If $P_{Exp} <$ APL, then more active modems can be supported. Thus, the test number $N_{Act}$ of active modems is incremented (step 1810), and the method proceeds back to step 1808.

Alternatively, if $P_{Exp} =$ APL, then the maximum number $N_{Max}$ of active modems is set equal to the present test number $N_{Act}$ (step 1812).

Alternatively, if $P_{Exp} >$ APL, then the maximum number $N_{Max}$ is set equal to the previous test number of active modems, that is, $N_{Act} - 1$ (step 1814).

If $P_{Exp}$ is neither equal to nor greater than APL then the process returns to step 1810 and step 1809. At some point a maximum number of modems may be reached or exceeded and either step 1812 or 1814, respectively, are reached. The process for recalculating APL checking the current N (number of access terminals in use), or checking $P_{Exp}$ relative to APL, may be repeated every so often or on a periodic basis as part of an iterative procedure to prevent overdriving the power amplifier.

IX. Example Transmit Power Limits

Table 1, below, includes exemplary modem transmit power limits that may be used in the present invention.

TABLE 1

| A<br>No. active modems<br>(Total<br>N = 16) | B<br>Active Modem<br>Limits (dBm)<br>APL = 10 dBW | C<br>Active Modem<br>Limits (dBm)<br>APL = 11 dBW | D<br>Active Modem<br>Limits (dBm)<br>APL = 10 dBW |
|---|---|---|---|
| 1.0 | 5.0 | 5.2 | 4.2 |
| 2.0 | 5.0 | 4.6 | 3.6 |
| 3.0 | 5.0 | 4.0 | 3.0 |
| 4.0 | 5.0 | 3.5 | 2.5 |
| 5.0 | 4.0 | 3.1 | 2.1 |
| 6.0 | 3.2 | 2.7 | 1.7 |
| 7.0 | 2.5 | 2.3 | 1.3 |
| 8.0 | 2.0 | 2.0 | 1.0 |
| 9.0 | 1.5 | 1.7 | 0.7 |
| 10.0 | 1.0 | 1.4 | 0.4 |
| 11.0 | 0.6 | 1.1 | 0.1 |
| 12.0 | 0.2 | 0.9 | −0.1 |
| 13.0 | −0.1 | 0.6 | −0.4 |
| 14.0 | −0.5 | 0.4 | −0.6 |
| 15.0 | −0.8 | 0.2 | −0.8 |
| 16.0 | −1.0 | 0.0 | −1.0 |

The transmit power limits of Table 1 may be stored in memory 215 of MWT 206. Table 1 assumes MWT 206 includes a total of N=16 modems. Each row of table 1 represents a corresponding number (such as 1, 2, 3, and so on, down the rows) of active ones of the N modems, at any given time. Each row of Column A identifies a given number of active modems. The number of inactive modems corresponding to any given row of Table 1 is the difference between the total number of modems (16) and the number of active modems specified in the given row.

Columns B, C and D collectively represent three different individual transmit power limit arrangements of the present invention. The transmit limit arrangement of column B assumes an APL of 10 dBW in MWT 206. Also, the arrangement of column B assumes that, in any given row, all of the active modems receive a common maximum transmit limit, while all of the inactive modems receive a common minimum transmit limit equal to zero. For example in column B, when the number of active modems is six (6), a common maximum transmit limit of 3.2 decibel-milliwatt (dBm) is established in each of the active modems, and a common minimum transmit limit of zero is established in each of the ten (10) inactive modems. The sum of the maximum transmit power limits in all of the active modems corresponding to any given row is equal to the APL.

The transmit limit arrangement of column C assumes an APL of 11 dBW in MWT 206. Also, the arrangement of column C assumes that, for any given number of active modems (that is, for each row in Table 1), all of the active modems receive a common maximum transmit limit, while all of the inactive modems receive a common minimum transmit limit equal to the maximum transmit limit less six (6) dB. For example in column C, when the number of active modems is six (6), a maximum transmit limit of 2.7 dBm is established in each of the six (6) active modems, and a minimum transmit limit of (2.7-6) dBm is established in each of the ten (10) inactive modems. The sum of the maximum transmit power limits in all of the active modems, together with the sum of the minimum transmit power limits in all of the inactive modems, corresponding to any given row is equal to the APL. Since the transmit power limit in each of the inactive modems is greater than zero, the inactive modems may be able to transmit at respective minimum data rates, or at least at the zero-data rate, in order to maintain their respective data links active.

The transmit limit arrangement of column D is similar to that of column C, except a lower APL of 10 dBW is assumed in the arrangement of column D. The arrangement of column D assumes that, for any given number of active modems (that is, for each row in Table 1), all of the active modems receive a common maximum transmit limit, while all of the inactive modems receive a common minimal transmit limit equal to the maximum transmit limit less six (6) dB. For example, from column D, when the number of active modems is six (6), a maximum transmit limit of 1.7 dBm is established in each of the active modems, and a transmit limit of (1.7-6) dBm is established in each of the ten (10) inactive modems.

Controller 214 can use the limits specified in Table 1 to establish and adjust individual transmit limits in modems 216 in methods 1500 and 1600, described above in connection with FIGS. 15 and 16. For example, assume the transmit limit arrangement of Table 1, column D, is being used with method 1600. Assume the number of active modems in a previous pass through step 710 is seven. During the previous pass, a transmit limit of 1.3 dBm is established in each of the seven active modems, and a transmit limit of (1.3-6) dBm is established in the nine inactive modems (see the entry in column D corresponding to seven active modems). Also assume that in the next pass through steps 1602 and 1614, the number of active modems is decreased from seven down to six. Then, at limit adjusting step 1620, a new transmit limit of 1.7 dB is established in each of the six active modems, and a transmit limit of (1.7-6) dB is established in each of the ten remaining inactive modems.

Figure 19:
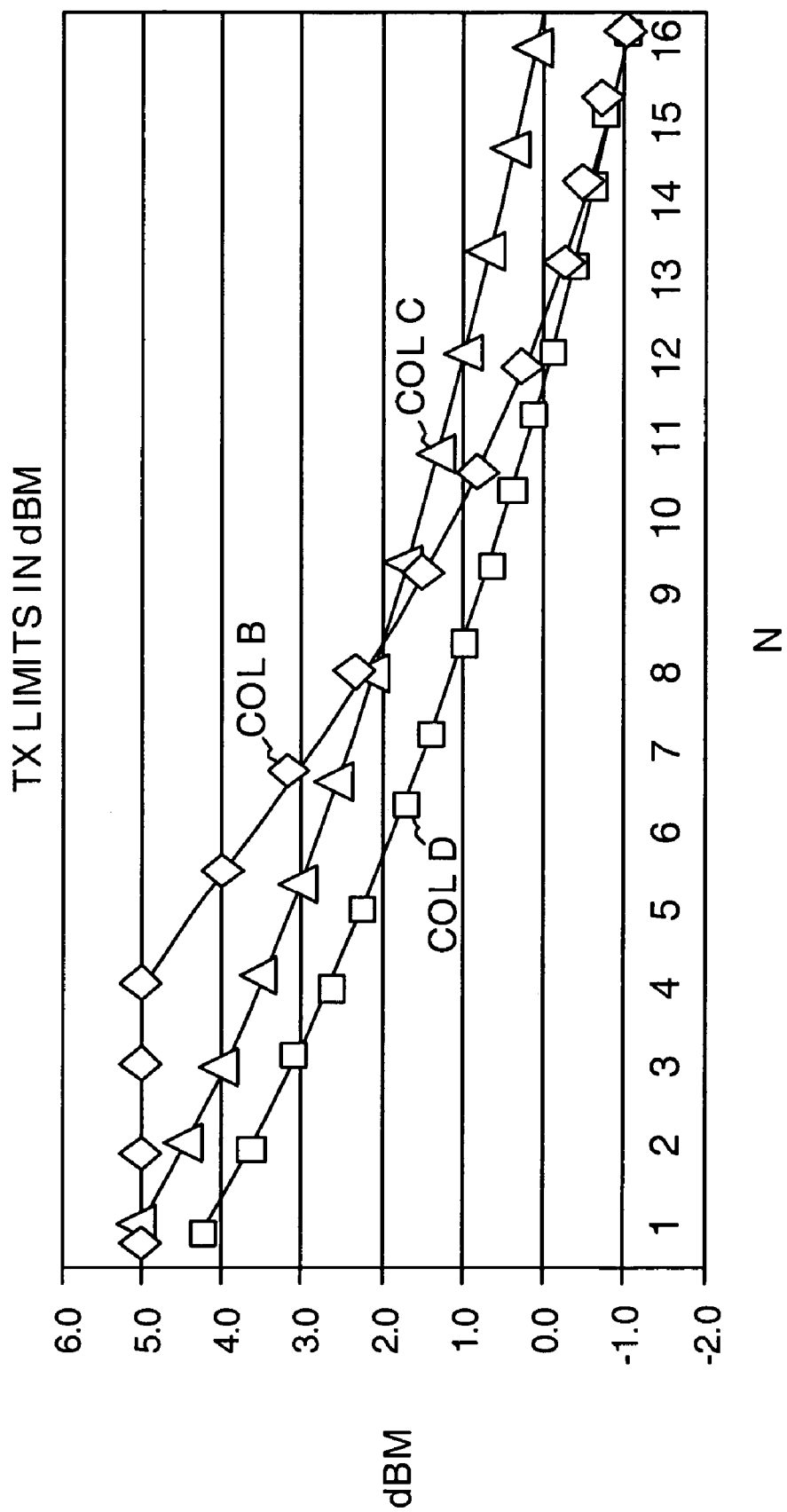
FIG. 19 is a graphical representation of different modem transmit limit arrangements.

FIG. 19 is a graphical representation of the information presented in Table 1. FIG. 19 is a plot of transmit limit power (in dBm) versus the number of active modems (labeled as N) for each of the transmit limit arrangements listed in columns B, C and D of Table 1. In FIG. 19, the transmit limit arrangement of column B is represented by a curve COL B, the limit arrangement of column C is represented by a curve COL C, and the limit arrangement of column D is represents by a curve COL D.

X. Method of Adjusting Modem Transmit Limits to Track Modem Transmit Powers

Figure 20:
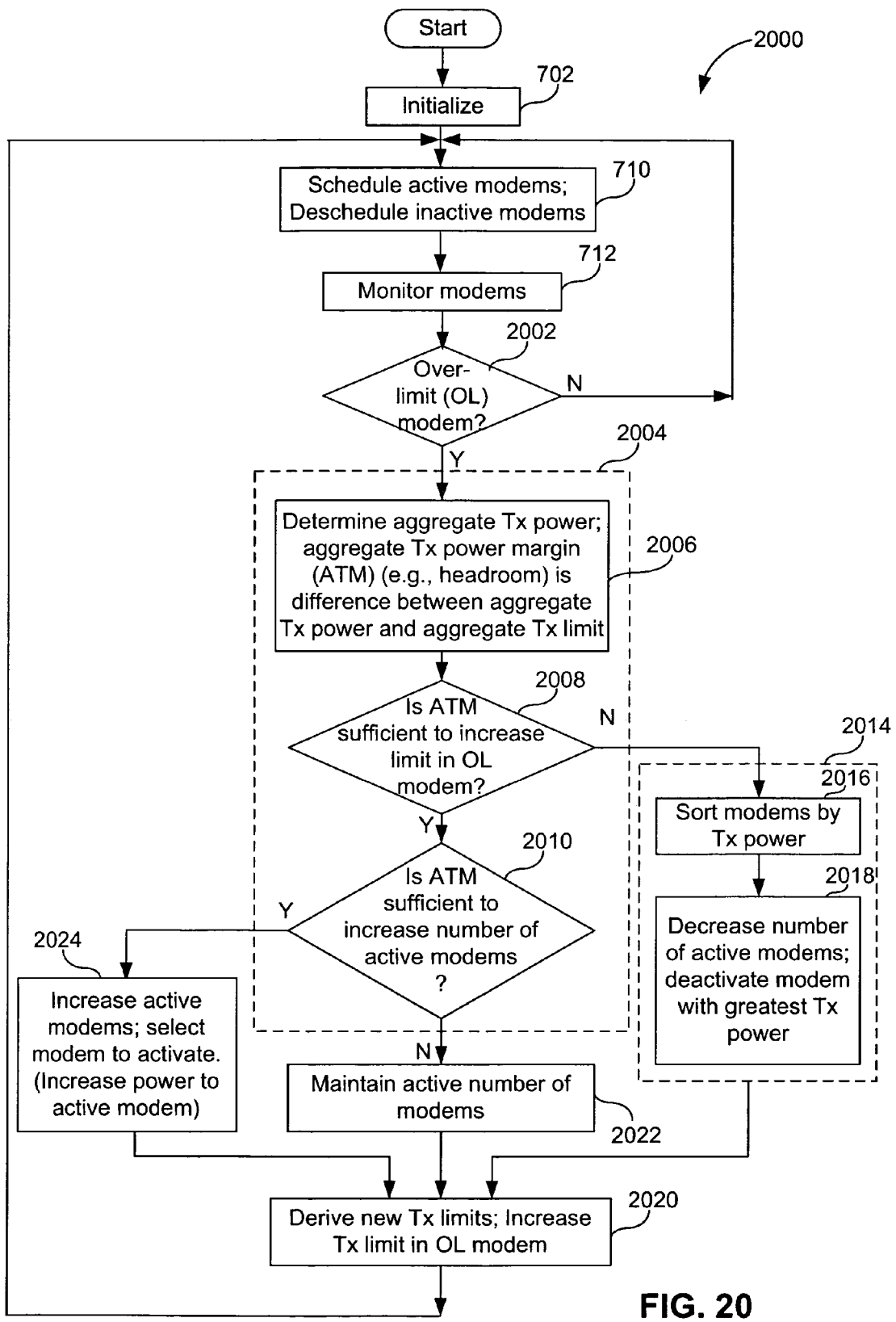
FIG. 20 is a flowchart of an example method of operating the mobile wireless terminal using dynamically varying individual modem transmit power limits, so the modem transmit limits track the modem transmit powers.

FIG. 20 is a flowchart of an example method 2000 of operating MWT 206 using dynamically varying individual modem transmit power limits. Method 2000 causes each individual modem transmit power limit to track the transmit power of the modem associated with the transmit power limit. Method 2000 includes steps 702, 710, and 712, as described previously. Steps 710 and 712 are repeated until controller 214 detects an over-limit (OL) modem at a step 2002, based on status reports 500 from the modems. When controller 214 detects an over-limit modem at step 2002, the controller determines whether or not to adjust or maintain the present number of active modems at a step 2004. In this manner, method 2000 is reactive to over-limit conditions in the modems of MWT 206. This processing allows one to increase the number of modems when the channel is good and extra throughput is required.

Step 2004 corresponds to step 1502 of method 1500, mentioned above in connection with FIG. 15. Step 2004 includes steps 2006, 2008, and 2010. At step 2006, controller 214 determines the aggregate transmit power of the N modems 216. For example, controller 214 may receive a transmit power measurement from transmit power monitor 234. Alternatively, controller 214 may: receive reported transmit power estimates $P_{Rep}(i)$ from the N modems; derive corrected power estimates $P_O(i)$ from the reported estimates using gain correction factors $g(i)$; and then combine the corrected power estimates into an aggregate transmit power estimate, representing the aggregate transmit power of the N modems. Gain correction factors $g(i)$ and corrected estimates $P_O(i)$ are described above in connection with FIG. 14.

At a next step 2008, controller 214 determines whether or not an aggregate transmit power margin (ATM) of MWT 206 is sufficient to permit an increase in the transmit power limit of the over-limit modem. The ATM represents the total amount of transmit power headroom existing between the aggregate transmit power and the aggregate transmit power limit. In one arrangement, the ATM is defined as a difference between the aggregate transmit power of the N modems and the aggregate transmit power limit.

Step 2008 can include a simple comparison to determine whether the aggregate transmit power is less than the APL by a predetermined amount required for increasing the individual transmit limit in the over-limit modem. An aggregate transmit power margin ATM of between 1 dB and 6 dB may be considered sufficient for increasing the transmit limit in the over-limit modem.

If the aggregate transmit margin ATM is insufficient to permit an increase in the transmit limit of the over-limit modem, then controller 214 takes further steps in an attempt to free-up or generate more aggregate transmit margin so that the transmit limit in the over-limit modem can be increased, and method processing proceeds to a next step 2014. Step 2014 includes steps 2016 and 2018 for decreasing the number of active modems. At step 2016, controller 214 sorts modems 216 according to their respective transmit powers. For example, controller 214 sorts the modems based on the respective reported transmit power estimates $P_{Rep}(i)$, as corrected by respective gain factors $g(i)$.

At next step 2018, controller 214 deactivates a modem having the greatest transmit power among the active modems. The eventual result of deactivating the modem in step 2018 is to reduce the aggregate transmit power of the N modems, and thus correspondingly increase the aggregate transmit margin ATM. Processing then proceeds to a transmit limit adjusting step 2020.

Returning again to step 2008, if the aggregate transmit margin ATM is sufficient to increase the transmit limit in the over-limit modem, then processing proceeds to step 2010. At step 2010, controller 214 determines whether or not the aggregate transmit margin is sufficient to increase the transmit limits in both the over-limit modem and another inactive modem. In other words, step 2010 determines whether there is sufficient transmit margin (for example, at least 3 dB of transmit margin) to increase the number of active modems. If not (that is, there is insufficient aggregate transmit margin to increase the number of active modems), then processing proceeds to a step 2022, wherein the number of active modems is maintained. The method proceeds from step 2022 to transmit limit adjusting step 2020.

On the other hand, if the aggregate transmit margin ATM is sufficient to increase the number of active modems or increase the transmit limit in the over-limit modem, then processing proceeds from step 2010 to a next step 2024, wherein the number of active modems is increased or power increased to an active modem. That is, if there is sufficient transmit margin then one is free to chose to apply this extra power to any modem desired, regardless of whether one is over limit or not. _Processing proceeds from step 2024 to limit adjusting step 2020. Steps 2014, 2022 and 2024 of method 2000 correspond to adjusting step 1504 of method 1500, while step 2020 corresponds to step 1506 of method 1500.

At limit adjusting step 2020, controller 214 adjusts the individual transmit power limits in at least some of the N modems based on the aggregate transmit power limit, the aggregate transmit power margin ATM, and the respective power estimates from the N modems, thereby causing each individual power limit to track the corresponding individual modem transmit power. Flow proceeds from step 2020 back to step 710.

Figure 21:
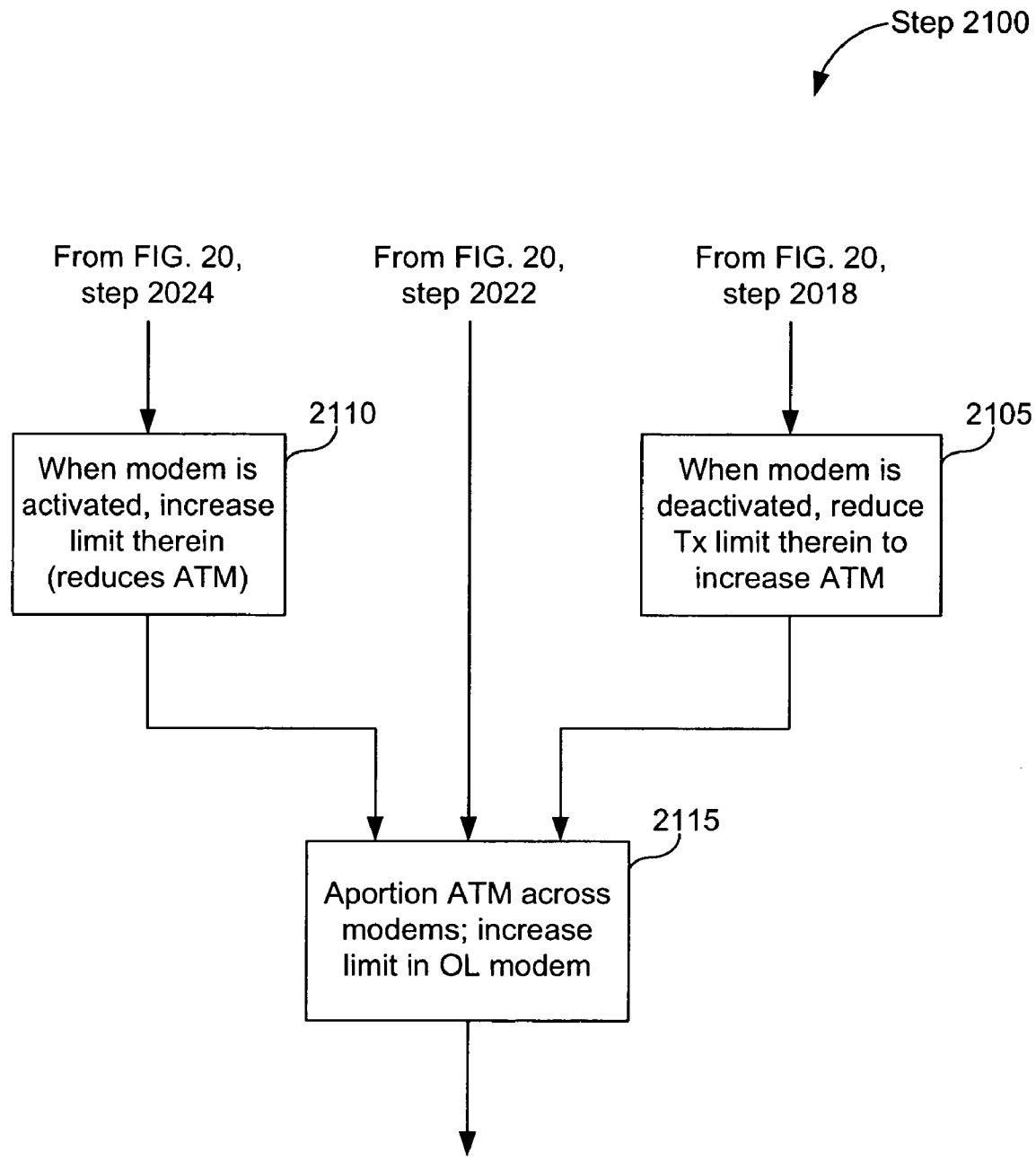
FIG. 21 is a flow chart of an example method expanding on the method of FIG. 20.

FIG. 21 is a flow chart of an example method 2100 expanding on limit adjusting step 2020 of method 2000. Processing proceeds from modem deactivating step 2018 of method 2000 (from FIG. 20) to a step 2105 of method 2100. At step 2105, controller 214 reduces the individual transmit power limit in the modem deactivated in step 2018. Controller 214 may reduce the individual transmit limit by 6 dB, for example. This permits a corresponding increase in the transmit power limit of the over-limit modem (determined in step 2002 of method 2000), without altering a combined transmit power limit of all of the N modems. The combined transmit power limit of all of the N modems is the sum of the N individual transmit power limits. The combined transmit power limit should not exceed the aggregate transmit power limit.

The method proceeds from modem activating step 2024 of method 2000 (from FIG. 20) to a step 2110 of method 2100. At step 2110, controller 214 increases the individual transmit limit in the modem activated in step 2024. Controller 214 may increase the individual transmit limit in the activated modem by an amount equal to the transmit power margin, less at least a few dB needed to increase the transmit limit in the over-limit modem.

Processing proceeds from steps 2105 and 2110, and from maintaining step 2022 of method 2000 (from FIG. 20), to a step 2115 of method 2100. At step 2115, controller 214 adjusts the individual transmit power limits in at least some of the N modems based on the aggregate transmit power limit and the respective transmit power estimates from the N modems, to cause each individual transmit power limit to track its corresponding modem transmit power. The transmit power limits are adjusted so that when all of the individual transmit power limits are combined into a combined transmit power limit, the combined transmit power limit is less than or equal to the aggregate transmit power limit. Also, each individual transmit power limit is preferably greater than the corresponding individual modem transmit power, to avoid over-limit conditions in the modems. To achieve the results mentioned above, controller 214 apportions the aggregate transmit margin ATM across the N modems as necessary, and increases the transmit limit in the over-limit modem.

Figure 22:
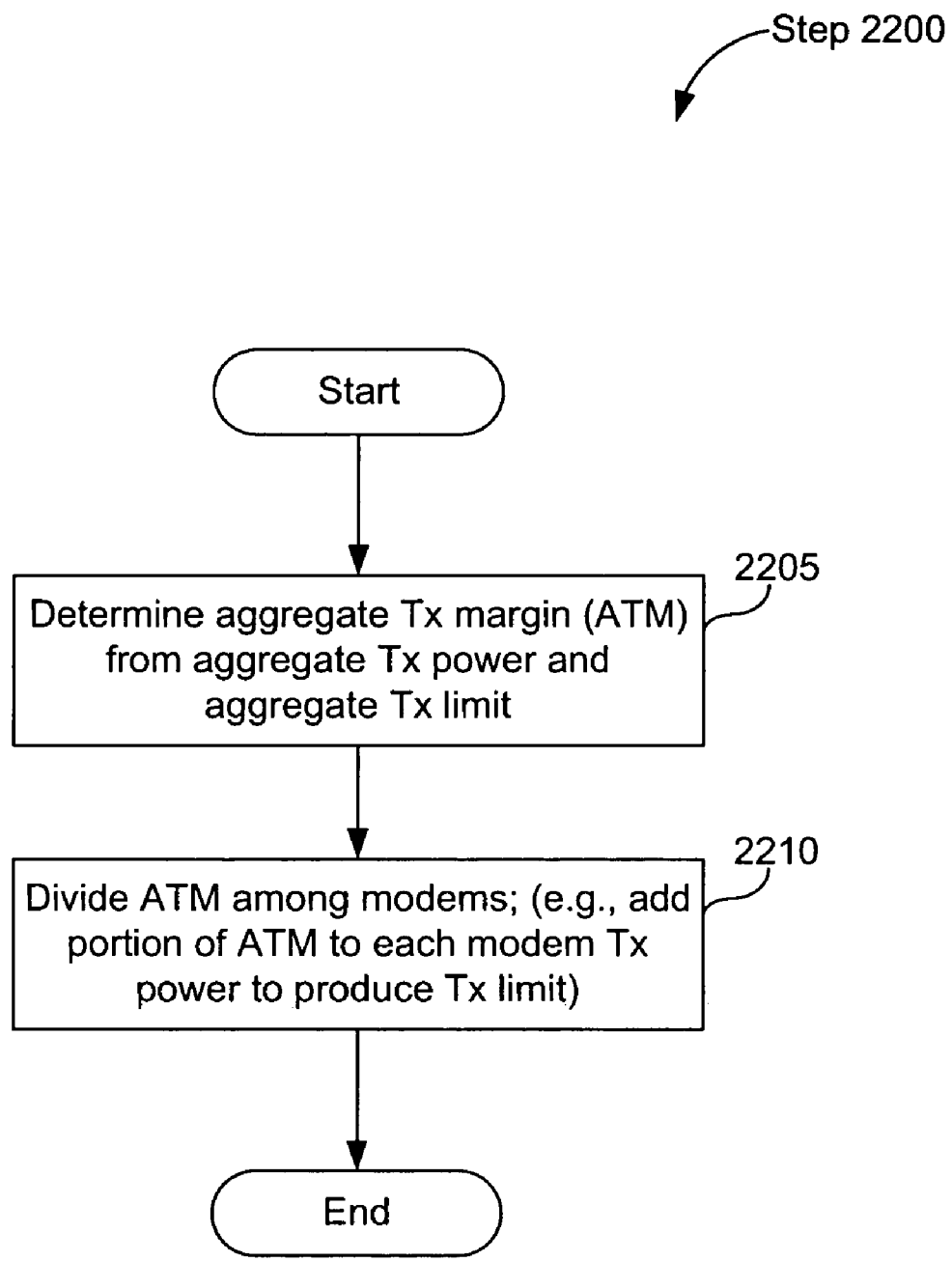
FIG. 22 is a flow chart of an example method expanding on the method of FIG. 21.

FIG. 22 is a flow chart of an example method 2200 expanding on step 2115. At a first step 2205, controller 214 determines the aggregate transmit margin ATM. This step may be optional because the aggregate transmit margin ATM may also be determined previously at step 2006.

At a next step 2210, controller 214 divides the aggregate transmit margin among at least some of the N modems to derive the individual transmit limits. In one arrangement, the aggregate transmit margin is evenly divided among the N modems. For example, assume the aggregate transmit margin is divided into N equal portions, where each portion is equal to X dB. Then the individual transmit limit for each modem 222$i$ may be derived by adding X dB to the estimated transmit power $P_{Rep}(i)$ of the modem. This produces a transmit limit in modem 222$i$ that exceeds the estimated transmit power by X dB, and thus, likely avoids an over-limit condition in the modem. Also, as this process is repeated over time, each individual transmit power limit tracks the transmit power of the corresponding modem. That is, each transmit power limit tends to increase and decrease with the corresponding modem transmit power.

Figure 23A:
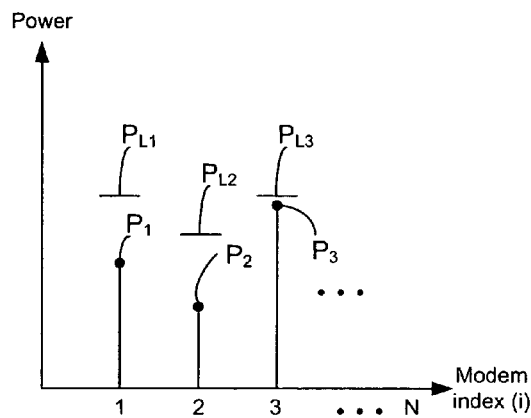
FIGS. 23A-23D are example plots of power versus modem index identifying modems being controlled in accordance with the method of FIG. 20, for different example transmit scenarios of the mobile wireless terminal of FIG. 2.

FIG. 23A is an example plot of power versus modem index (i) identifying respective ones of modems 216 being controlled in accordance with method 2000. FIG. 23A corresponds to an example transmit scenario in MWT 206 occurring at a first time $t_1$. Modem(1) has a respective modem transmit power $P_1$ and a respective transmit power limit $P_{L1}$, modem(2) has a respective modem transmit power $P_2$ and a respective transmit power limit $P_{L2}$, and so on. The depicted transmit powers $P_i$ can represent actual modems transmit powers, reported modem transmit powers $P_{Rep}(i)$, or adjusted modem transmit powers $P_O(i)$. As depicted, the respective modem transmit power limits vary from modem to modem in accordance with the respective modem transmit powers. Each modem transmit power limit $P_{Li}$ is slightly greater than the corresponding modem transmit power $P_i$.

Figure 23B:
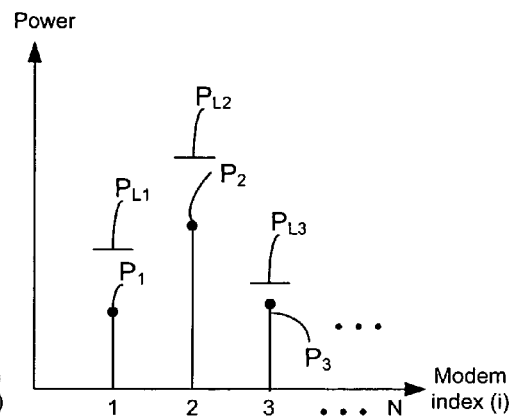

FIG. 23B corresponds to an example transmit scenario in MWT 206 occurring at a second time $t_2$, some time after first time $t_1$. The respective modem transmit powers depicted in FIG. 23B have changed with respect to FIG. 23A, however, the respective transmit power limits have also changed in correspondence with the transmit powers. The power limits track the changes.

Figure 23C:
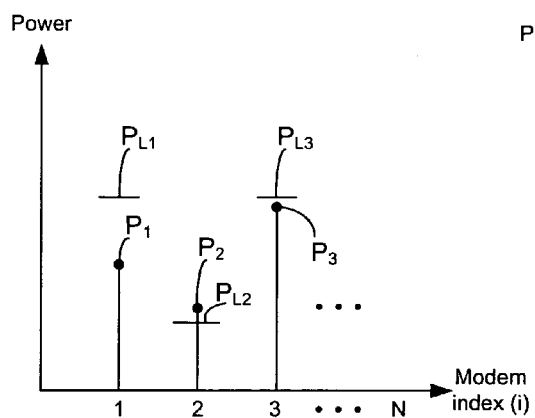

FIG. 23C corresponds to an example transmit scenario in MWT 206 wherein the transmit power $P_2$ of modem(2) exceeds the transmit power limit. This corresponds to a possible over-limit condition of modem(2). In response, method 2000 increases the transmit power limit in modem (2) to avoid the over-limit condition, and redistributes any remaining aggregate transmit power margin among the other modems.

Figure 23D:
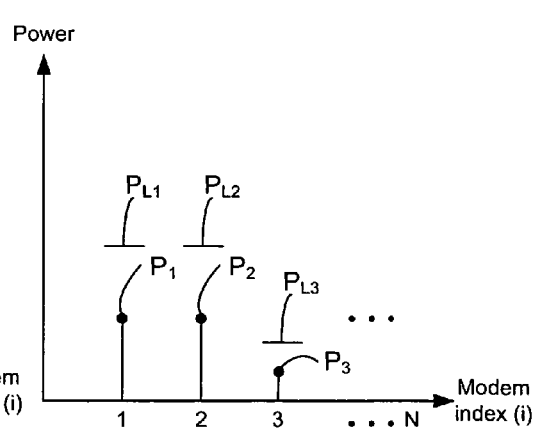

FIG. 23D corresponds to an example transmit scenario in MWT 206 after method 2000 has reacted to the over-limit scenario of FIG. 23C. In FIG. 23D, transmit power limit $P_{L2}$ of modem(2) has been adjusted by method 2000 to exceed transmit power $P_2$ of modem(2). Also, the decrease in modem transmit power $P_3$ provides a corresponding increase in the aggregate transmit power margin ATM. The increased ATM is allocated across the modems.

XI. MWT Computer Controller

Figure 24:
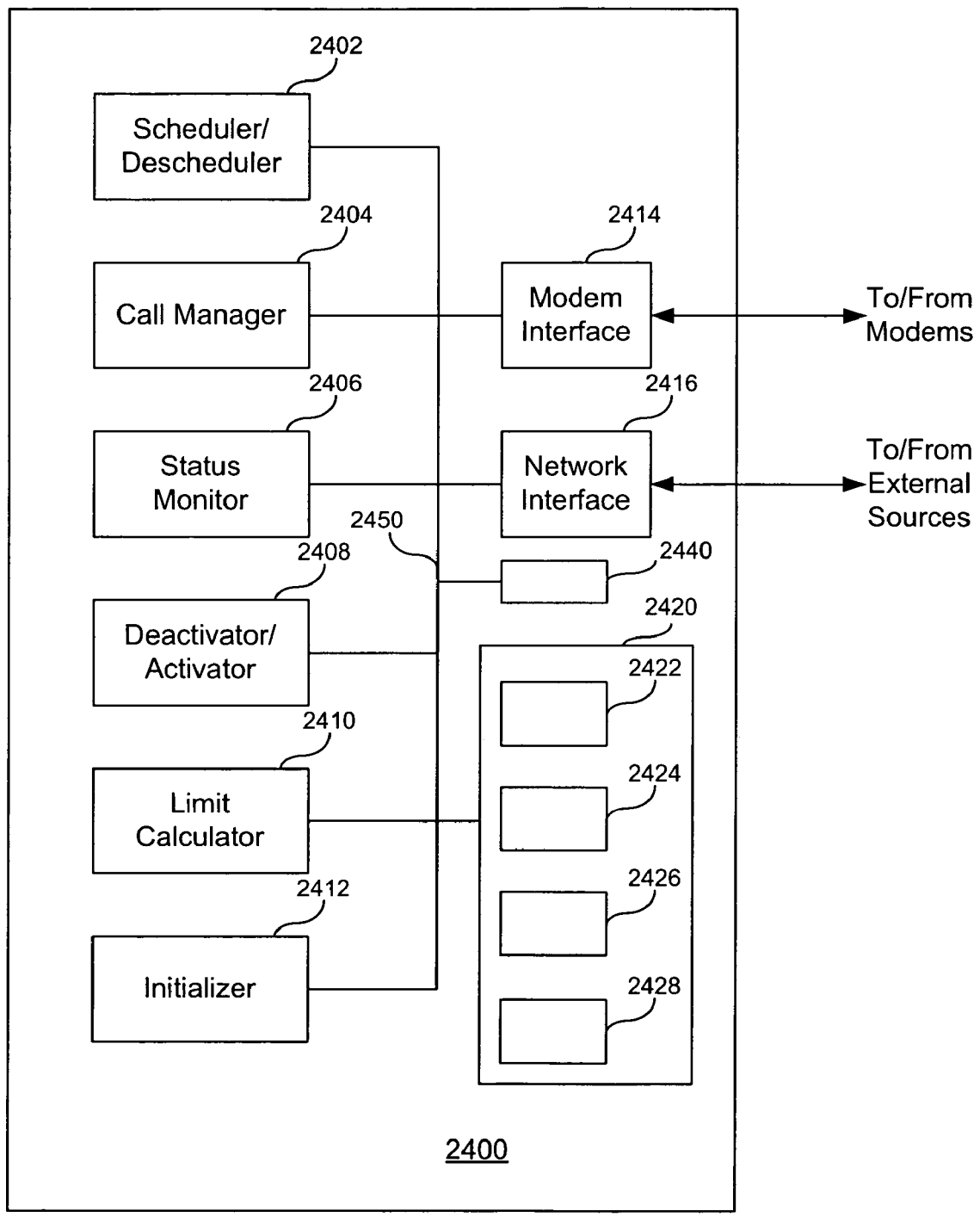
FIG. 24 is a functional block diagram of an example controller of the mobile wireless terminal of FIG. 2, for performing the methods of the present invention.

FIG. 24 is a functional block diagram of an example controller (which can also be a plurality of controllers) 2400 representing controller 214. Controller 2400 includes a series of controller modules for performing the various method steps of the embodiments discussed above.

A scheduler/de-scheduler 2402 schedules active modems to transmit payload data, and to deschedule inactive modems, while a call manager 2404 establishes data calls and tears-down data calls over the plurality of modems 216.

A status monitor 2406 monitors status reports from modems 216, for example, to determine when various ones of the modems are over-limit, and collects modem transmit data rates and transmit powers. Status monitor 2406 may also determine an aggregate data rate and an aggregate transmit power based on the modem reports.

A deactivator/activator module 2408 acts to deactivate over-limit ones (in the fixed limit arrangement of the present invention) of the modems (for example by removing the modems from the active list) and to activate deactivated ones of the modems by reinstating the modems on the active list. Module 2408 also activates/deactivates selected ones of the modems in accordance with steps 1504, 1612, 1614, 2014, and 2024 of methods 1500, 1600, and 2000.

A limit calculator 2410 operates to calculate/derive transmit power limits for each of the modems 216. Limit calculator also accesses predetermined transmit power limits stored in memory 215, for example. Limit calculator 2410 calculates transmit power limits in accordance with steps 1506, 1620, and 2020.

An initializer 2412 is used to supervise/manage initialization of the system, such as establishing initial transmit power limits in each modem, setting up calls over each modem, initializing various lists and queues in MWT 206, and so on; a modem interface 2414 receives data from and transmits data to modems 216; and a network interface 2416 operates to receive and transmit data over interface 210.

A module 2420 is used for determining whether to adjust the number of active modems in accordance with steps 1502, 1602, and 2004 of methods 1500, 1600 and 2400. Module 2420 includes a sub-module 2422 for determining a maximum number of active modems that can be supported based on either an average-energy-per-transmitted-bit or individual modem energy-per-transmitted-bits. Sub-module 2422 includes comparing logic (such as a comparator) configured to operate in accordance with comparing step 1606 of method 1600. Module 2420 also includes sub-modules 2424 and 2426 for determining the average-energy-per-transmitted-bit and the individual modem energy-per-transmitted-bits, respectively. Sub-modules 2424 and 2426, or alternatively, status monitor 2406, also determine an aggregate data rate and an aggregate transmit power based on modem reports. Module 2420 also includes a sub-module 2428 for determining the sufficiency of an aggregate transmit power margin ATM in accordance with steps 2008 and 2010 of method 2000.

A calibration module 2440 controls calibration in MWT 206 in accordance with method 1400, for example. The calibration module includes an equation generator to generate simultaneous equations and an equation solver to solve the equations to determine modem correction factors g(i). The calibration module can also call/incorporate other modules, as necessary, to perform calibration of MWT 206.

A software interface 2450 is used for interconnecting all of the above mentioned modules to one another.

Features of the present invention can be performed and/or controlled by processor/controller 214, which in effect comprises a programmable or software controllable element, device, or computer system. Such a computer system includes, for example, one or more processors that are connected to a communication bus. Although telecommunication-specific hardware can be used to implement the present invention, the following description of a general purpose type computer system is provided for completeness.

The computer system can also include a main memory, preferably a random access memory (RAM), and can also include a secondary memory and/or other memory. The secondary memory can include, for example, a hard disk drive and/or a removable storage drive. The removable storage drive reads from and/or writes to a removable storage unit in a well known manner. The removable storage unit, represents a floppy disk, magnetic tape, optical disk, and the like, which is read by and written to by the removable storage drive. The removable storage unit includes a computer usable storage medium having stored therein computer software and/or data.

The secondary memory can include other similar means for allowing computer programs or other instructions to be loaded into the computer system. Such means can include, for example, a removable storage unit and an interface. Examples of such can include a program cartridge and cartridge interface (such as that found in video game devices), a removable memory chip (such as an EPROM, or PROM) and associated socket, and other removable storage units and interfaces which allow software and data to be transferred from the removable storage unit to the computer system.

The computer system can also include a communications interface. The communications interface allows software and data to be transferred between the computer system and external devices. Software and data transferred via the communications interface are in the form of signals that can be electronic, electromagnetic, optical or other signals capable of being received by the communications interface. As depicted in FIG. 2, processor 214 is in communications with memory 215 for storing information. Processor 214, together with the other components of MWT 206 discussed in connection with FIG. 2, performs the methods of the present invention.

In this document, the terms "computer program medium" and "computer usable medium" are used to generally refer to media such as a removable storage device, a removable memory chip (such as an EPROM, or PROM) within MWT 206, and signals. Computer program products are means for providing software to the computer system.

Computer programs (also called computer control logic) are stored in the main memory and/or secondary memory. Computer programs can also be received via the communications interface. Such computer programs, when executed, enable the computer system to perform certain features of the present invention as discussed herein. For example, features of the flow charts depicted in FIGS. 7-10, 14-18, and 20-22, can be implemented in such computer programs. In particular, the computer programs, when executed, enable processor 214 to perform and/or cause the performance of features of the present invention. Accordingly, such computer programs represent controllers of the computer system of MWT 206, and thus, controllers of the MWT.

Where embodiments are implemented using software, the software can be stored in a computer program product and loaded into the computer system using the removable storage drive, the memory chips or the communications interface. The control logic (software), when executed by processor 214, causes processor 214 to perform certain functions of the invention as described herein.

Features of the invention may also or alternatively be implemented primarily in hardware using, for example, a software-controlled processor or controller programmed to perform the functions described herein, a variety of programmable electronic devices, or computers, a microprocessor, one or more digital signal processors (DSP), dedicated function circuit modules, and hardware components such as application specific integrated circuits (ASICs) or programmable gate arrays (PGAs). Implementation of the hardware state machine so as to perform the functions described herein will be apparent to persons skilled in the relevant art(s).

The previous description of the preferred embodiments is provided to enable a person skilled in the art to make or use the present invention. While the invention has been particularly shown and described with reference to embodiments thereof, it will be understood by those skilled in the art that various changes in form and details may be made therein without departing from the spirit and scope of the invention.

XII. Conclusion

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or many combinations thereof. Thus, the breadth and scope of the present invention should not be limited by any of the above-described exemplary embodiments, but should be defined only in accordance with the following claims and their equivalents.

The invention claimed is:

1. A method of controlling transmit power in a data terminal constrained to operate within an aggregate transmit power limit, the data terminal including N wireless modems having their respective transmit outputs combined to produce an aggregate transmit output, the method comprising:
   (a) establishing an individual transmit power limit in each of the N modems;
   (b) scheduling each of a plurality of the N modems to transmit respective data;
   (c) receiving a respective, reported transmit power estimate from each of the N modems; and
   (d) adjusting the individual transmit power limits in at least some of the N modems based on the aggregate transmit power limit and the respective transmit power estimates from the N modems, to cause each individual transmit power limit to track a corresponding individual modem transmit power.

2. The method of claim 1, wherein step (d) comprises adjusting the individual transmit power limits such that
   when the N individual transmit power limits are combined into a combined transmit power limit, the combined transmit power limit is less than or equal to the aggregate transmit power limit, and
   each individual transmit power limit is greater than the corresponding individual modem transmit power.

3. The method of claim 1, further comprising, prior to step (a), establishing an individual wireless communication link between each of the N modems and a remote station, each communication link including a forward link and a reverse link.

4. The method of claim 3, wherein each wireless communication link is a Code Division Multiple Access (CDMA) communication link.

5. In a data terminal constrained to operate within an aggregate transmit power limit, the data terminal including N wireless modems having their respective transmit outputs combined to produce an aggregate transmit output, the modems having individual transmit power limits to limit their respective transmit powers, the modems reporting respective transmit power estimates, a method of deriving the individual transmit power limits, comprising:
   (b) determining an aggregate transmit power encompassing all of the N modems;
   (b) deriving an aggregate transmit power margin based on a difference between the aggregate transmit power and the aggregate transmit power limit; and
   (c) dividing the aggregate transmit power margin among the N modems to produce, for each of the N modems, an individual transmit power limit that is greater than the corresponding transmit power estimate for each modem.

6. The method of claim 5, wherein step (c) comprises dividing the aggregate transmit power equally among the N modems.

7. The method of claim 5, further comprising, prior to step (a):
   producing a corrected transmit power estimate from each transmit power estimate using a corresponding predetermined, modem gain correction factor; and
   performing steps (a) and (c) using the corrected transmit power estimates.

8. An apparatus for controlling a wireless terminal constrained to operate within an aggregate transmit power limit, the wireless terminal including N wireless modems having their respective transmit outputs combined to produce an aggregate transmit output, comprising:
   means for establishing an individual transmit power limit in each of the N modems;
   means for scheduling each of a plurality of the N modems to transmit respective data;
   means for receiving a respective, reported transmit power estimate from each of the N modems; and
   means for adjusting the individual transmit power limits in at least some of the N modems based on the aggregate transmit power limit and the respective transmit power estimates from the N modems, to cause each individual transmit power limit to track a corresponding individual modem transmit power.

9. The apparatus of claim 8, wherein the adjusting means comprises means for adjusting the individual transmit power limits such that when the N individual transmit power limits are combined into a combined transmit power limit, the combined transmit power limit is less than or equal to the aggregate transmit power limit, and each individual transmit power limit is greater than the corresponding individual modem transmit power.

10. An apparatus for deriving modem transmit limits in a wireless terminal constrained to operate within an aggregate transmit power limit, the wireless terminal including N wireless modems having their respective transmit outputs combined to produce an aggregate transmit output, the modems having individual transmit power limits to limit their respective transmit powers, the modems reporting respective transmit power estimates, comprising:

means for determining an aggregate transmit power encompassing all of the N modems;

means for deriving an aggregate transmit power margin based on a difference between the aggregate transmit power and the aggregate transmit power limit; and means for dividing the aggregate transmit power margin among the N modems to produce, for each of the N modems, an individual transmit power limit that is greater than the corresponding transmit power estimate for each modem.

11. The apparatus of claim 10, wherein the dividing means comprises dividing the aggregate transmit power equally among the N modems.

12. A computer-readable medium storing instructions for controlling transmit power in a data terminal constrained to operate within an aggregate transmit power limit, the data terminal including N wireless modems having their respective transmit outputs combined to produce an aggregate transmit output, the instructions comprising:

instructions to establish an individual transmit power limit in each of the N modems;

instructions to schedule each of a plurality of the N modems to transmit respective data;

instructions to receive a respective, reported transmit power estimate from each of the N modems; and instructions to adjust the individual transmit power limits in at least some of the N modems based on the aggregate transmit power limit and the respective transmit power estimates from the N modems, to cause each individual transmit power limit to track a corresponding individual modem transmit power.

* * * * *